(12) United States Patent
Hattori

(10) Patent No.: US 7,288,852 B2
(45) Date of Patent: *Oct. 30, 2007

(54) ELECTRONIC DEVICE STARTER AND VEHICLE TIRE MONITORING SYSTEM

(75) Inventor: Yutaka Hattori, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/411,820

(22) Filed: Apr. 27, 2006

(65) Prior Publication Data

US 2006/0192438 A1    Aug. 31, 2006

Related U.S. Application Data

(63) Continuation of application No. 10/363,391, filed as application No. PCT/JP02/06511 on Jun. 27, 2002, now Pat. No. 7,088,016.

(30) Foreign Application Priority Data

Jul. 2, 2001    (JP) .............................. 2001-201267

(51) Int. Cl.
*B60L 1/00* (2006.01)
(52) U.S. Cl. ...................................... 307/9.1
(58) Field of Classification Search ................. 307/9.1
See application file for complete search history.

(56) References Cited

U.S. PATENT DOCUMENTS 5,706,199 A    1/1998    Wilson et al.
6,381,700 B1    4/2002    Yoshida
6,431,680 B1 *  8/2002    Shinada ........................ 347/19
6,574,798 B1    6/2003    Bradley et al.

FOREIGN PATENT DOCUMENTS

JP    62-128671 A1    6/1987

(Continued)

OTHER PUBLICATIONS

International Search Report, Oct. 15, 2002.

(Continued)

*Primary Examiner*—Michael Sherry
*Assistant Examiner*—Dru Parries
(74) *Attorney, Agent, or Firm*—Knobbe Martens Olson & Bear LLP

(57) ABSTRACT

To provide an electronic device starter that does not waste electric power while it is not being used and a vehicle tire monitoring system in which the starter is used for eliminating waste of electric power of batteries for its detectors. In a vehicle tire monitoring system according to the present invention, a monitor unit sends a start signal at time intervals T1 by using an electromagnetic wave, a rectifier circuit 33 in a detector 3 which received the start signal converts a high-frequency electromotive force caused by the start signal at an antenna 31 into electric energy, this electric energy operates a central processing section 34, a detector section 35, and a transmitting section 36, the central processing section 34 which started operating places a Field Effect Transistor 382 in the on state to supply electric power from a battery 381 to a sensor section 37 to operate the sensor section 37.

8 Claims, 26 Drawing Sheets

FOREIGN PATENT DOCUMENTS

| | | |
|---|---|---|
| JP | 01-245791 A1 | 9/1989 |
| JP | 2-66091 | 5/1990 |
| JP | 04-049484 A1 | 2/1992 |
| JP | 08-167014 A1 | 6/1996 |
| JP | 08-244424 A1 | 9/1996 |
| JP | 2000-324560 A1 | 11/2000 |
| WO | WO-03/005318 A1 | 1/2003 |

OTHER PUBLICATIONS

PCT/IB/308, Apr. 2002.
PCT/IB/304, Jul. 1998.
PCT/IB/301, Apr. 2002.
PCT/ISA/220, Apr. 2002.

* cited by examiner

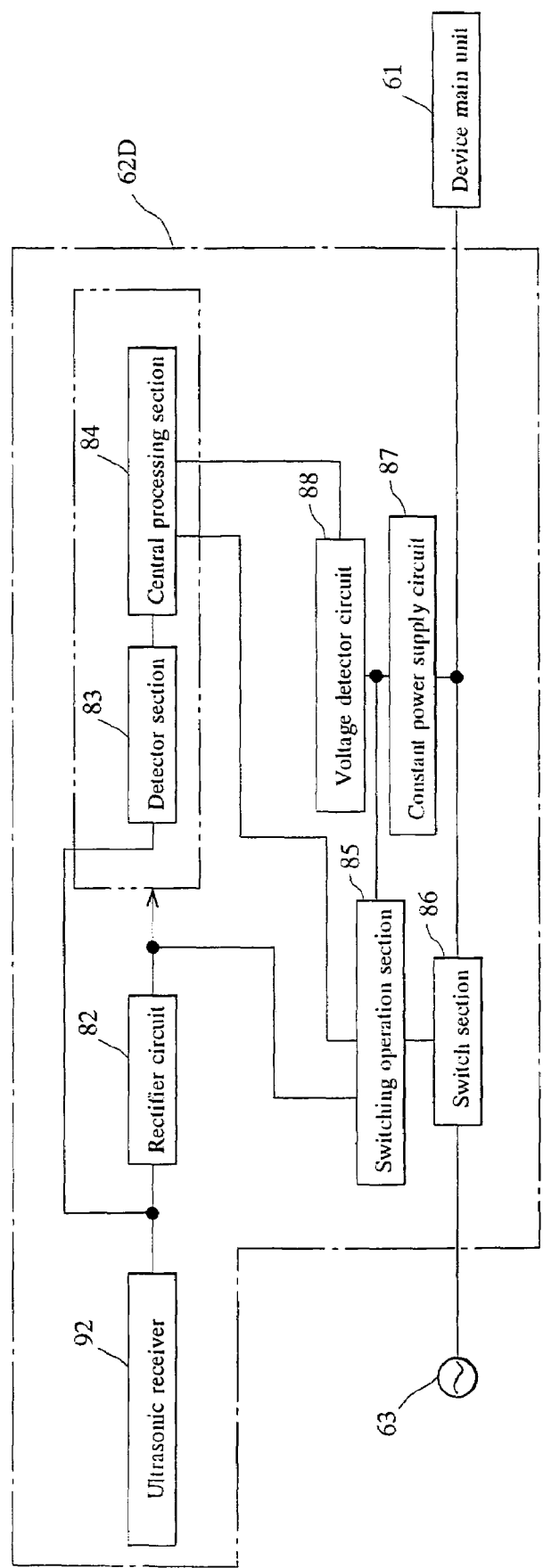

ELECTRONIC DEVICE STARTER AND VEHICLE TIRE MONITORING SYSTEM

CROSS REFERENCE TO RELATED APPLICATIONS

This application is a continuation of U.S. application Ser. No. 10/363,391 (now U.S. Pat. No. 7,088,016), filed on Mar. 3, 2003, which is the national stage of International Application Number PCT/JP02/06511, filed on Jun. 27, 2002, designating the United States of America, which claims priority under U.S.C. § 119 to Japanese Application Number 201267/2001 filed on Jul. 2, 2001.

TECHNICAL FIELD

The present invention relates to an electronic device starter for starting operation of electronic devices by remote control and to a vehicle tire monitoring system in which the starter is used to reduce battery drain.

BACKGROUND ART

Remote controllers have been known that operate any electronic devices, including electric appliances such as television sets, audio devices, and lighting apparatuses, by remote control. A remote controller of this type consists of a palm-sized operation module contained in a small casing and a controller provided within an electronic device to be controlled and operated. The controller is consistently supplied with electric power so as to be kept ready for receiving a control signals from the operation module.

Tire monitoring systems have also been known in which a sensor is provided for each tire and the conditions of the tire that are detected by the sensor are wirelessly transmitted over a communication circuit to a monitor provided in the vicinity of the driver's seat of a vehicle and displayed for ready monitoring of the conditions of tires of the vehicle at the driver's seat.

Most tire monitoring systems of this type use a battery (a storage battery or dry cell) as a power supply for the sensor because the sensor circuit provided in their sensor unit consumes more electric power than their communication circuit. If a sensor that operates on a battery is used, the battery must be replaced, or recharged if the battery is a secondary battery, before it becomes exhausted because battery exhaustion would stop the operation of the sensor. If a battery is exhausted frequently, it takes a lot of trouble to replace or recharge the battery, therefore measures are taken for minimizing battery drain.

For example, in a sensor disclosed in Japanese Patent Laid-Open No. 3-154999, means is provided that supplies power to a receiving module only for a predetermined time period at predetermined time intervals to operate it and supplies power to a sending module only during transmission in order to minimize battery drain.

In a sensor disclosed in Japanese Patent Laid-Open No. 2-268027, timing for receiving an interrogation signal and sending a reply signal is controlled by a timer circuit and power supply to other circuits except the timer circuit is shut off unless the interrogation signal is to be received or the reply signal is required to be sent so that battery drain is minimized.

However, the conventional remote controllers described above are not in keeping with energy saving commonly demanded today because a controlling unit provided within an electronic device is constantly supplied with power and thus a large amount of electric power is unnecessarily consumed.

The tire monitoring systems described above also waste battery power in their sensors during a time period in which monitoring of the conditions of tires is not required, that is, the vehicles are not used.

In light of the problems described above, an object of the present invention is to provide an electronic device starter that does not waste electric power while the device is not being used and a vehicle tire monitoring system in which the electronic device starter is used to eliminate unnecessary battery power consumption in its sensors.

SUMMARY OF THE INVENTION

To achieve the object, the present invention configures an electronic device starter for wirelessly starting operation of an electronic device from a position remote from the electronic device, with an operation directing unit to be operated by a user and an operation control unit provided in the electronic device so that the operation control unit operates on energy of a wireless signal, such as an electromagnetic-wave, ultrasonic, or optical signal, that is received from the operation directing unit. This avoids electric power consumption in the electronic device and operation control unit during a period in which the electronic device is not in operation.

The operation directing unit in the electronic device starter of the present invention includes start signal sending means for wirelessly sending a start signal that directs the electronic device to start operation, for example. The operation control unit further comprises receiving means for receiving a wireless signal sent from the operation directing unit; detection means for detecting a start signal from among the wireless signals received by the receiving means; energy conversion means for converting the wireless signal received by the receiving means into electric energy for operating the operation control unit; switch means interposed on a power supply line supplying operating power to the electronic device for turning on and off power supply to the electronic device; and switch control means for changing the switch means from the on state to the off state when the detection means detects the start signal.

When a start signal is wirelessly sent from the start signal sending means of the operation directing unit remote from the electronic device to the operation control unit in the electronic device starter having the configuration described above, the wireless signal is received by the receiving means of the operation control unit and the received wireless signal is converted by the energy conversion means into an electric signal for operating the operation control unit. The electric signal causes the operation control unit to start operating, then a start signal is detected from among wireless signals by the detection means, and then the switch control means changes the status of the switch means from the off state to the on state.

The switch means is interposed on the power supply line supplying operating power to the electronic device. Therefore, if the switch means is in the off state, operating power supply to the electronic device is shut off and the electronic device is placed in the non-operation state.

When the switch means is changed from the off state to the on state, operating power is supplied to the electronic device and the electronic device starts operation.

Thus, the operation control unit operates on the energy of the wireless signal received and therefore power consumption in the electronic device and the operation control unit can be avoided while the electronic device is not in operation.

Furthermore, according to the present invention, the start signal is sent from the operation directing unit for a predetermined time period from operation start time to operation stop time of the operation directing unit and the switch control means of the operation control unit places the switch means in the on state only while electric energy is being supplied from the energy conversion means so that the operation control unit operates only while the energy triggered by the start signal is being supplied to it. The time intervals at which a start signal is sent are set shorter than a time period in which energy conversion means can supply by reception of one start signal an amount of electric energy large enough for the operation control unit to operate for a predetermined period of time. Accordingly, the operation control unit can continually operate during a time period from operation start time to operation stop time of the operation directing unit when a start signal is sent from the operation directing unit at the above-mentioned time intervals.

In addition, the present invention provides state retaining means in the operation control unit for keeping the switch means in the on state if electric energy supply from the energy conversion means stops after the switch control means changes the switch means from the off state to the on state. This can keep the switch means in the on state after electric energy supply from the energy conversion means in the operation control unit stops. Accordingly, operating power is supplied to the electronic device over the power supply line even if the operation control unit is shut down, thereby allowing the electronic device to be kept in operation.

Furthermore, switch state detection means is provided in the operation control unit for detecting the on/off state of the switch means and means is provided in the switch control means for placing the switch means in the off state based on the result of detection by the switch state detection means if the switch means is in the on state and the detection means detects a start signal. In this arrangement, when the operation control unit receives a start signal sent from the operation directing unit while the electronic device is in operation, the switch state detection means detects the on/off state of the switch means and, if the switch means is in the on state, places the switch means in the off state, therefore the electronic device is kept in operation during a period from time at which the start signal is received in the operation control unit until the next start signal is received.

In addition, an operation section including a switch is provided in the operation directing unit so that the start signal sending means sends a start signal according to an actuation of the switch by an operator. Thus, the start signal can be sent from the start signal sending means when the switch on the operation section is operated by the operator.

According to the present invention, identification information for identifying an electronic device to be operated is included in a signal sent from the operation directing unit to the operation control unit so that the operation control unit turns on or off the electronic device if its own identification information matches identification information it receives.

According to the present invention, pulses of electromagnetic waves, sound waves, ultrasonic waves, or light in ambient atmosphere of the electronic device are converted into electric energy and the electric energy is used as a portion of energy for operating the operation control unit.

According to the present invention, the above-described electronic device starter is applied to a vehicle tire monitoring system.

In the tire monitoring system of the present invention, a detector is provided at each tire that includes a sensor unit operating on electric power supplied from a battery and communication means for wirelessly sending tire conditions detected by the sensor unit as detection information. The monitoring system also comprises a monitor unit installed in the vicinity of the driver's seat of the vehicle for receiving and displaying the detection information sent from the detector.

The monitor unit in the tire monitoring system of the present invention further comprises start signal sending means for wirelessly sending a start signal that directs the detector to start operating and the detector comprises operation control means.

This operation control means comprises receiving means for receiving a start signal sent from the monitor unit, detection means for detecting the start signal from among signals received by the receiving means, energy conversion means for converting a signal received by the receiving means into electric energy for operating the operation control means, switch means interposed on a power supply line supplying operating power from a battery to the sensor unit for turning on and off electric power supply to the sensor unit, and switch control means for changing the switch means from the off state to the on state when the detection means detects the start signal.

In the vehicle tire monitoring system of the present invention, when a start signal is wirelessly sent by the start signal sending means of the monitor unit, the receiving means of the operation control means in the detector receives the wireless signal and the received wireless signal is converted by the energy conversion means into an electric signal for operating the operation control means. This electric signal causes the operation control means to start operating and, when the start signal is detected from among wireless signals by the detection means, the off state of the switch means is changed to the on state by the switch control means and operating power is supplied from the battery to the sensor unit to operate the sensor unit. When the switch means, which is interposed between the battery and the sensor unit, is in the off state, operating power to the sensor unit is shut off and therefore the sensor unit is placed in the non-operation state. When the switch means is changed from the off state to the on state, operating power is supplied to the sensor unit and the sensor unit starts operating. Because the operation control means operates on energy of the wireless signal received, no electric power is consumed in the sensor unit and operation control means while the sensor unit is in a non-operation state, thus avoiding unnecessary battery wastage.

According to the present invention, time intervals at which the start signal is sent are set shorter than a time period in which electric energy can be supplied by reception of one start signal. Thus, if a start signal is sent from the monitor unit at the time intervals, the operation control means of the detector continuously operates in a time period from a time at which the monitor unit starts to operate until it stops. Therefore, the total amount of time that the start signal is sent from the monitor unit can be reduced.

According to the present invention, when a start signal is received by the receiving means of the detector, the detector performs a detection information transmission process and sends the detection information to the monitor unit.

According to the present invention, the communication means of the detector operates on electric energy outputted from the energy conversion means. Thus, the communication means does not consume electric power of the battery, and accordingly, battery power consumption can be reduced.

BRIEF DESCRIPTION OF THE DRAWINGS

FIG. 28 is a block diagram of an electric system circuitry of an operation control unit according to the seventh embodiment of the present invention.

DETAILED DESCRIPTION

One embodiment of the present invention will be described below with respect to the drawings.

Figure 1:
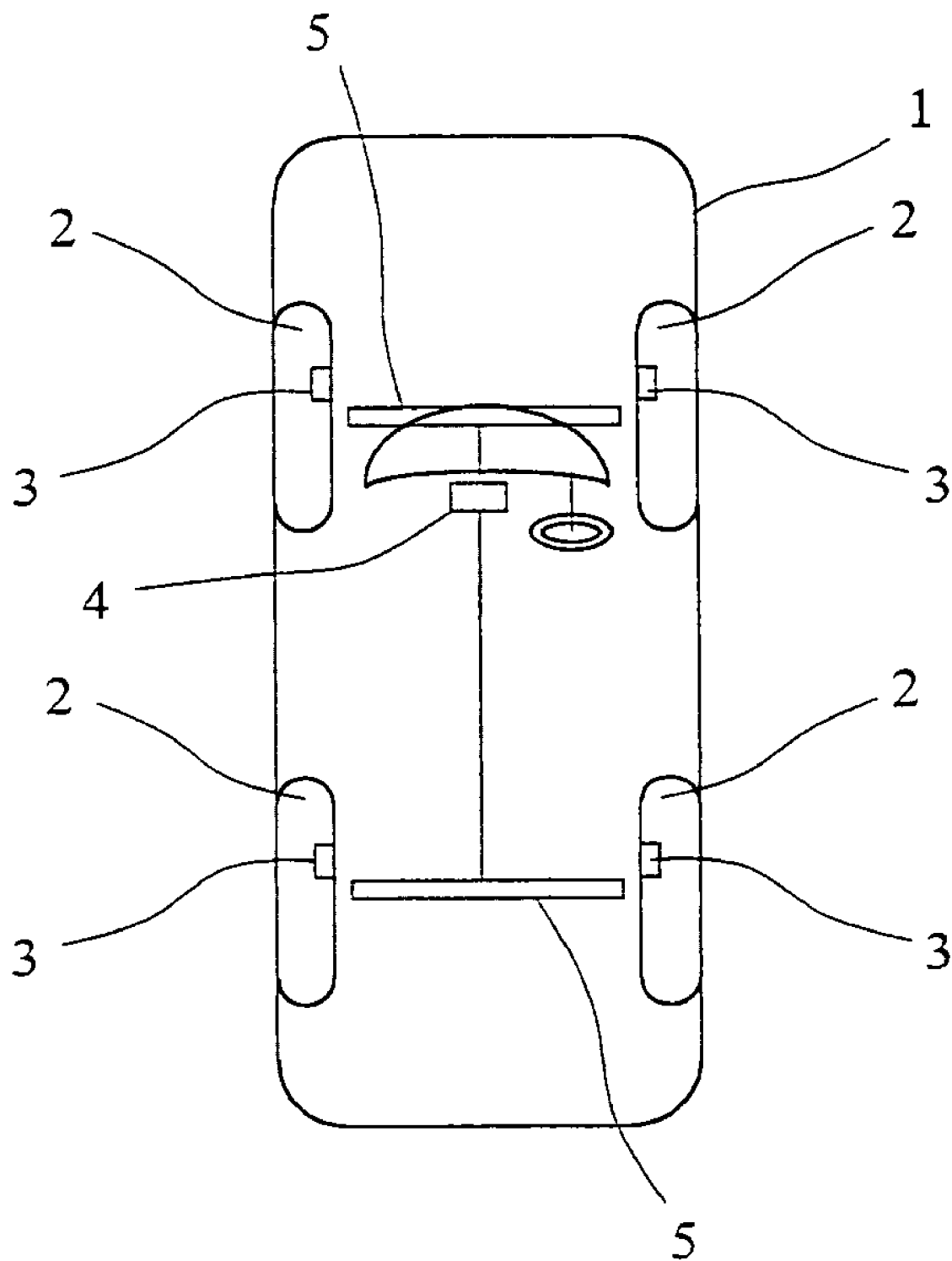
FIG. 1 is a configuration diagram showing an entire vehicle tire monitoring system according to a first embodiment of the present invention.
Figure 2:
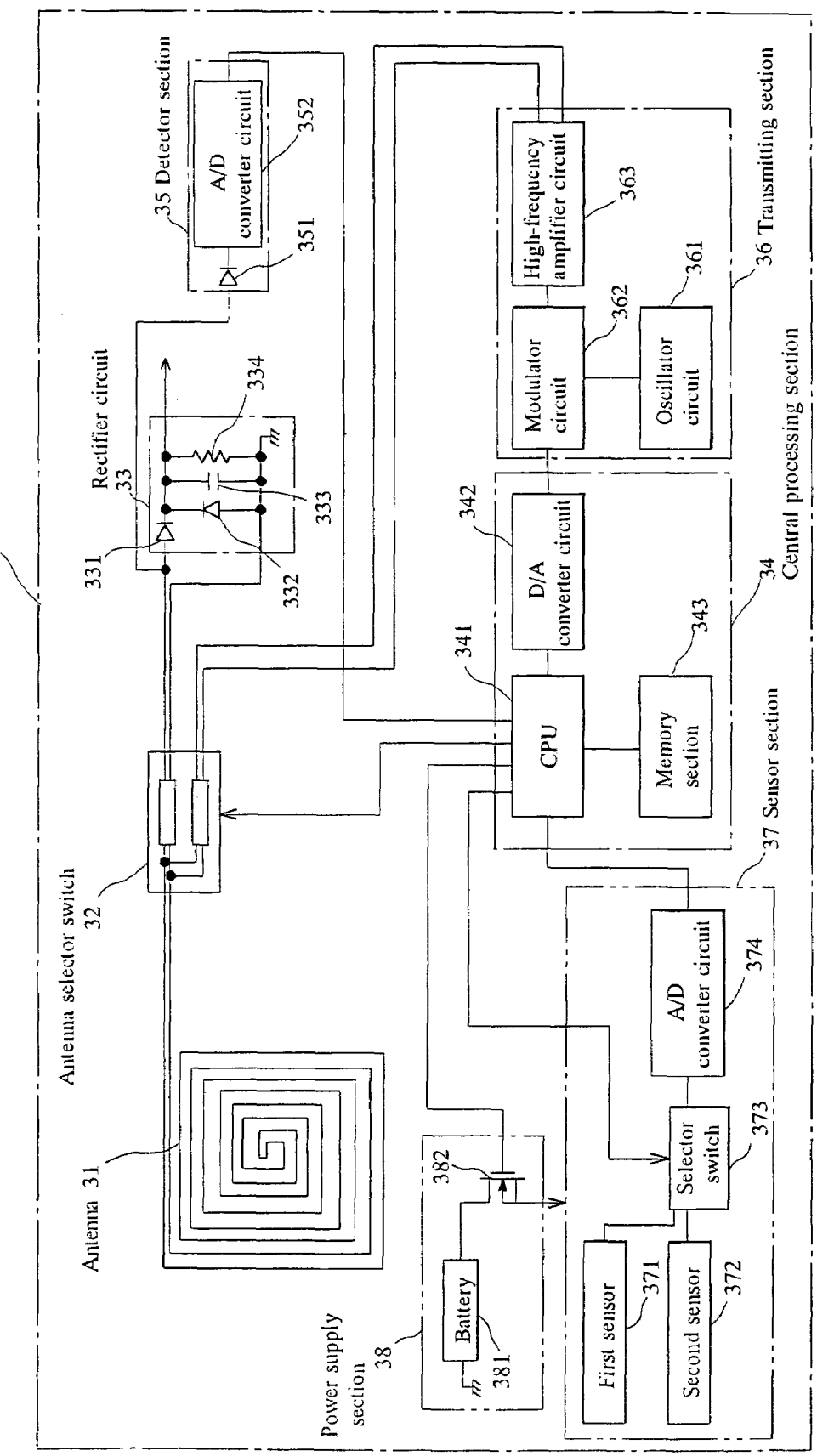
FIG. 2 is a block diagram showing an electric system circuitry of a detector according to the first embodiment of the present invention.
Figure 3:
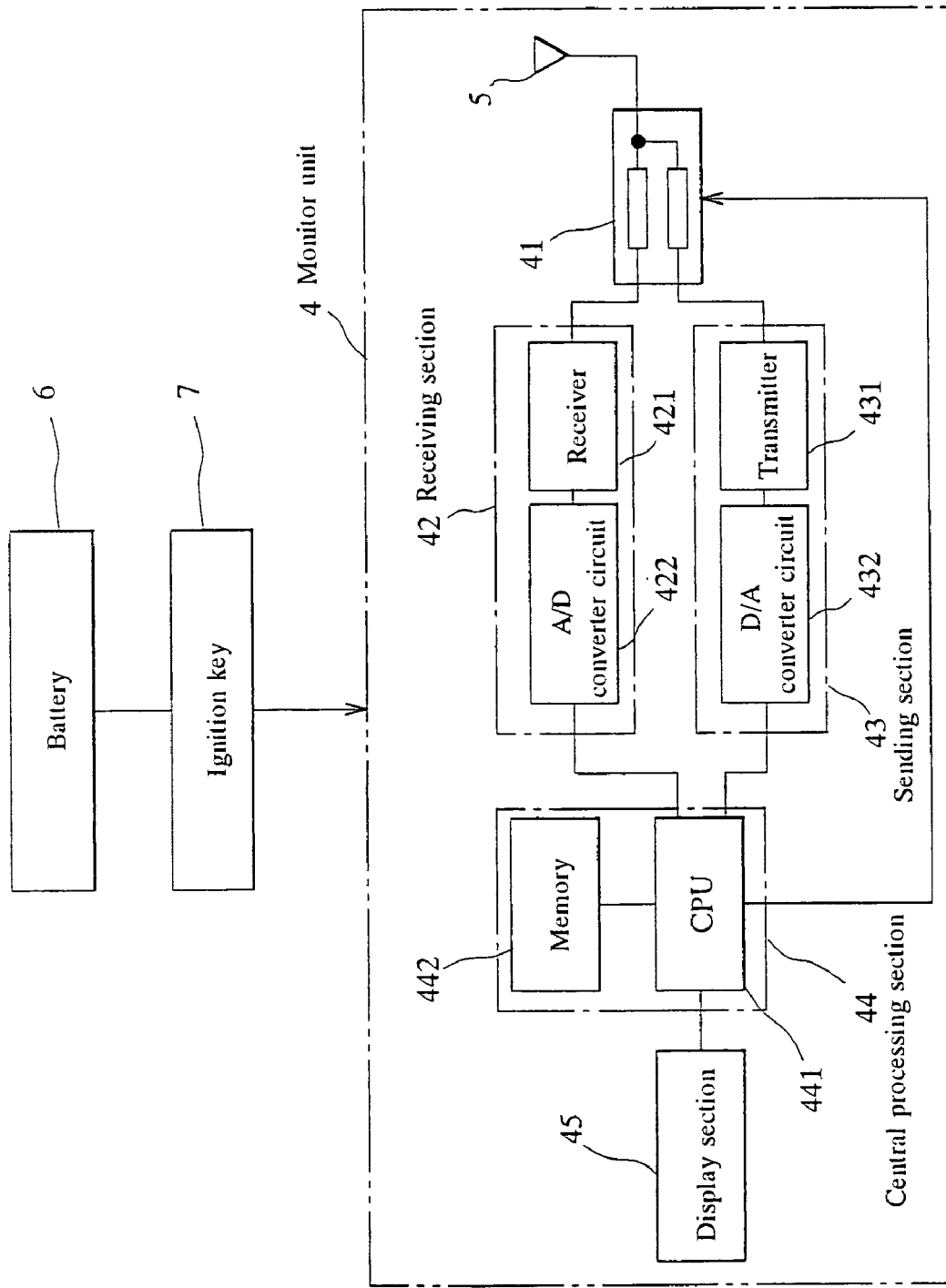
FIG. 3 is a block diagram showing an electric system circuitry of a monitor unit according to the first embodiment of the present invention.

FIG. 1 is a configuration diagram showing an entire vehicle tire monitoring system according to a first embodiment of the present invention, FIG. 2 is a block diagram showing electric system circuitry of a detector according to the first embodiment, and FIG. 3 is a block diagram showing electric system circuitry of a monitor unit according to the first embodiment.

In FIG. 1, reference numeral 1 indicates a vehicle, which may be a four-wheel passenger car, for example, in which a detector 3 is provided at each of the four fires 2 for detecting the conditions of the tire. In addition, a monitor unit 4 is installed in the vicinity of the driver's sheet of the vehicle 1. Antennas 5 connected to the monitor unit 4 are provided in the vicinity of the front wheels and in the vicinity of the rear wheels.

The detector 3 comprises an antenna 31, an antenna selector switch 32, a rectifier circuit 33, a central processing section 34, a detector section 35, a transmitting section 36, a sensor section 37, and a power supply section 38 as shown in FIG. 2.

The antenna 31, which is used for communicating with the monitor unit 4 via an electromagnetic wave, is tuned to a predetermined communication frequency, which may be 415 MHz, for example.

The antenna selector switch 32 is formed by an electronic switch, for example, and switches the antenna 31 between the connection of the antenna 31 with the rectifier circuit 33 and the detector section 35 and the connection of the antenna 31 with the transmitting section 36, under the control of the central processing section 34.

The rectifier circuit 33 is formed by a well-known full-wave rectifier circuit comprising diodes 331 and 332, a capacitor 333, and a resister 334. The antenna 31 is connected to the input of the rectifier circuit 33 through the antenna selector switch 32. The rectifier circuit 33 rectifies a high-frequency current induced at the antenna 31 into direct current. The direct current outputted from the rectifier circuit 33 is provided to the central processing section 34, detector section 35, and transmitting section 36 as an operating current.

The central processing section 34 comprises a well-known CPU 341, a digital/analog (hereinafter referred to as D/A) converter circuit 342 and a memory section 343. The CPU 341 operates based on a program stored in a semiconductor memory in the memory section 343. When the CPU 341 is supplied with power and starts to operate, it connects a battery 381 in the power supply section 38 to the sensor section 37 to operate it and wirelessly sends data detected by the sensor section 37 to the monitor unit 4. If a signal received from the monitor unit 4 contains a write instruction along with information to be written, the CPU 341 updates, adds or deletes information in the memory section 341 according to the write instruction.

In the program for the CPU 341, specification is set that the CPU 341 should send a reply signal when it receives a start signal from the monitor unit 4. Also specified in the program for the CPU 341 is the minimum time interval between transmission of a reply signal to the monitor unit 4 and the next reply signal transmission, as a reply signal transmission time interval T2. In the present embodiment, the start signal is set in the program as a signal for requesting a reply signal from the detector 3.

The memory section 343 comprises a ROM in which the program for operating the CPU 341 is recorded and an electrically rewritable non-volatile semiconductor memory such as an EEPROM (electrically erasable programmable read-only memory). In addition, identification information unique to each detector 3 is prestored during manufacturing in an area in the memory section 343 that is specified as being unrewritable.

The detector section 35 comprises a diode 351 and an analog/digital (hereinafter referred to as A/D) converter 352. The anode of the diode 351 is connected to the antenna 31 and its cathode is connected to the CPU 341 in the central processing section 34 through the A/D converter 352. This allows a received signal to be converted into digital data by the detector section 35 and inputted into the CPU 341.

The transmitting section 36 comprises an oscillator circuit 361, a modulator circuit 362, and a high-frequency amplifier circuit 363. In the transmitting section 36, a carrier is oscillated by the oscillator circuit 361, the oscillated carrier is modulated by the modulator circuit 362 based on an information signal inputted from the central processing section 34 and then provided to the antenna 31 through the high-frequency amplifier circuit 363 and the antenna selector switch 32.

The sensor section 37 comprises a first and second sensors 371 and 372, a selector switch 373, and an A/D converter circuit 374. As the first and second sensors 371 and 372, sensors are used that detect the condition of the tires 2, convert them into electric signals, and output them. For example, sensors such as air pressure sensors, temperature sensors, pressure sensors, humidity sensors, and vibration sensors may be used. In the present embodiment, an air pressure sensor is used as the first sensor 371 that detects the air pressure in a tire and outputs a voltage corresponding to the detected air pressure and a temperature sensor is used as the second sensor 372 that detects the temperature in the tire and outputs a voltage corresponding to the temperature.

The selector switch 373 is formed by an electronic switch, for example, and selects and connects the output of the first sensor 371 or the output of the second sensor 372 to the input of the A/D converter circuit 374 under the control of the central processing section 34.

The A/D converter circuit 374 converts an output voltage inputted from the first sensor 371 or the second sensor 372 into a digital value and outputs it to the CPU 341.

The power supply section 38 comprises a battery 381 and an N-channel field-effect transistor (hereinafter referred to as an FET) 382. The positive pole of the battery 381 is connected to the drain of the FET 382 and electric power outputted from the source is supplied to the sensor section 37. A control signal outputted from the CPU 341 is inputted into the gate of the FET 382 and the FET 382 performs switching operation according to the control signal. The control signal inputted into the gate of the FET 382 is an active HIGH signal. The FET 382 is turned off when the control signal inputted into the gate goes LOW and power supply from the battery 381 to the sensor section 37 is shut off. The CPU 341 outputs a low-level control signal to the gate of the FET 382 when operating power is not supplied.

The monitor unit 4 comprises an antenna 5, a selector switch 41, a receiving section 42, a sending section 43, a central processing section 44, and a display section 45 as shown in FIG. 3. The monitor unit 4 is supplied with operating power from a battery 6 of the vehicle 1 through an ignition key 7.

The antenna 5 is used for communicating with the four detectors 3 by using an electromagnetic wave and is tuned to a predetermined communication frequency, which may be 415 MHz, for example.

The antenna selector switch 41 is formed by an electronic switch, for example, and switches the antenna 5 between the connection of the antenna 5 with the receiving section 42 and the connection of the antenna 5 with the sending section 43 under the control of the central processing section 44.

The receiving section 42 comprises a receiver 421 and an A/D converter circuit 422. The receiver 421 of which the input is connected to the antenna 5 through the antenna selector switch 41 receives a reply signal sent from the detector 3, detects it, and outputs the signal to the central processing section 44 through the A/D converter circuit 422.

The sending section 43 comprises a transmitter 431 and a D/A converter circuit 432. The transmitter 431 converts a start signal which is inputted from the central processing section 44 and to be provided to the detector 3 into a high-frequency signal and provides it to the antenna 5 through the antenna selector switch 41.

The central processing section 44 comprises a well-known CPU 441 and memory 442 and, when operating power is supplied from the battery 6 to the monitor unit 4, automatically sends a start signal and displays sensor information received from each of the four detectors 3 associated with each of the four tiers 2, on a display panel in a display section 45, as will be described later. The start signal is repeatedly sent at start signal sending time intervals T1 preset in a program for the CPU 441.

Figure 4:
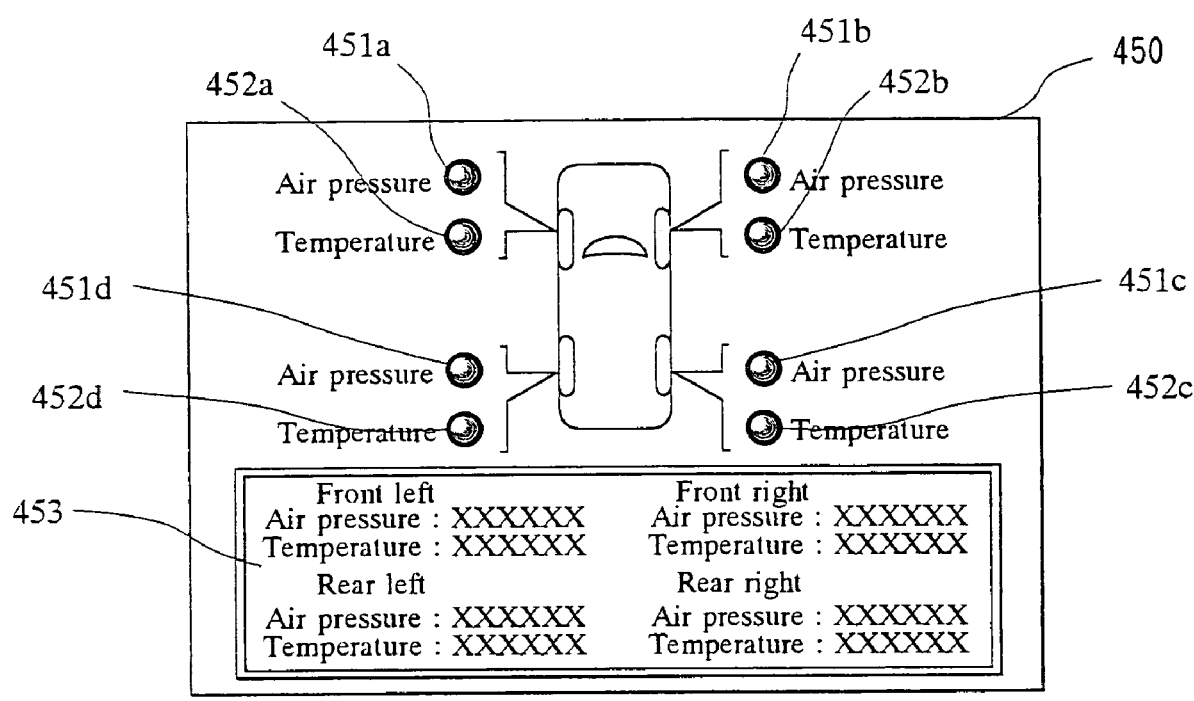
FIG. 4 is a diagram showing a display panel of the monitor unit according to the first embodiment of the present invention.

Display section 45 displays information detected by the sensor in each detector 3 and inputted from the CPU 441. The display section 45 includes the display panel 450 as shown in FIG. 4. A diagram of the vehicle is drawn in the center of the upper section of the display panel 450 so that the positions of the tires can be readily seen. Provided on both sides of the drawing of the vehicle and associated with the tires are LEDs 451*a*-451*d*, which switch between two colors, red and green, to indicate whether the air pressure of each of the tires is proper or not, and LEDs 452*a*-452*d* which switch between two colors, red and green, to indicate whether the temperature in each of the tires is proper or not. In addition, a liquid crystal display 453 is provided in the lower section of the display panel 450 for providing the digital display of the detected air pressure and temperature of each tire 2.

An operation of the vehicle tire monitoring system having the configuration described above will be described below with reference to FIGS. 5 to 10.

A feature of the tire monitoring system according to the present embodiment is that operating power is supplied from the battery 381 to the sensor section 37 in each detector 3 only while the monitor unit 4 is operating. This can avoid unnecessarily consuming electric power of the battery 381 of each detector 3 and provide longer life of the battery 381 than possible heretofore, therefore it becomes unnecessary to replace the battery 381 of each detector 3 at frequent intervals.

That is, the FET 382 in power supply section 38 of each detector 3 is placed in the on state and power is supplied from the battery 381 to the sensor section 37 only while the CPU 341 is operating. This will be detailed below.

Figure 5:
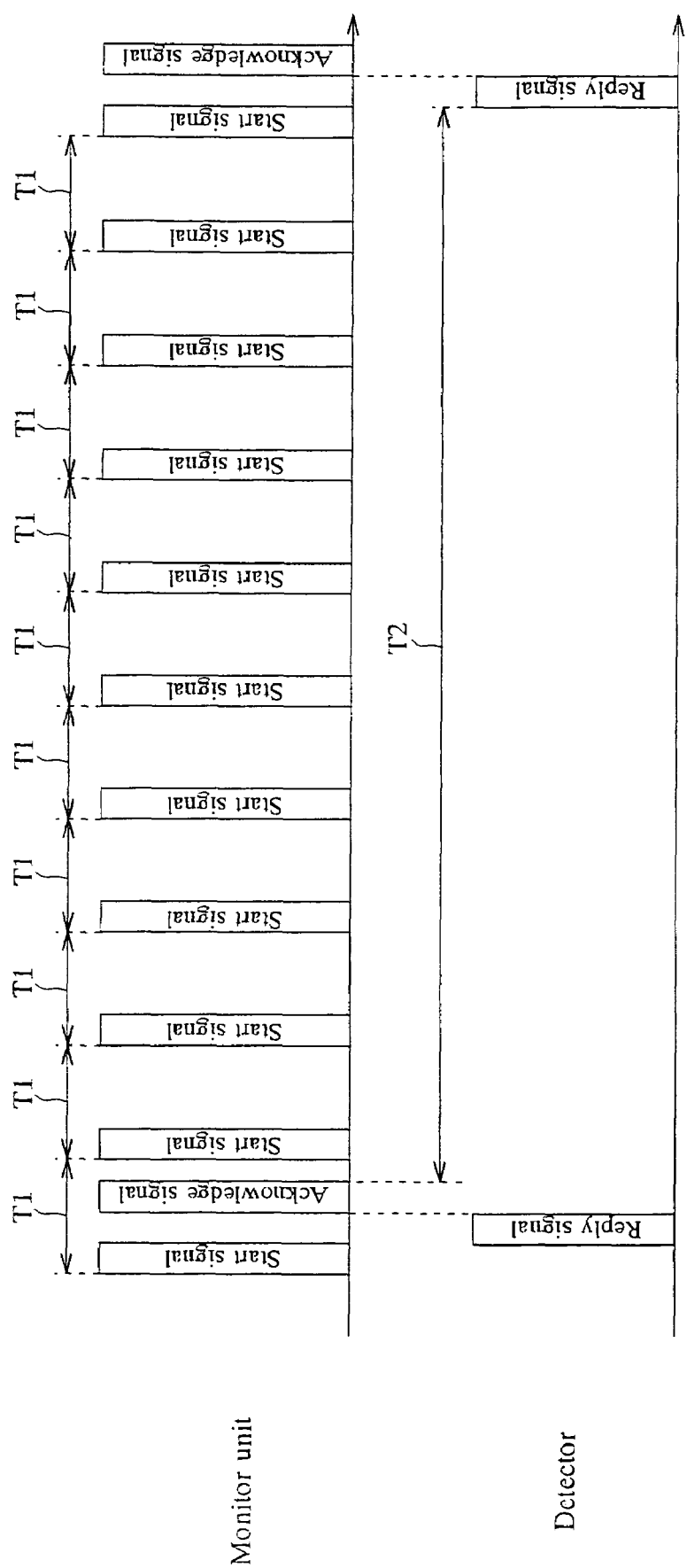
FIG. 5 is a diagram showing transmission timing of a start signal and a reply signal according to the first embodiment of the present invention.
Figure 6:
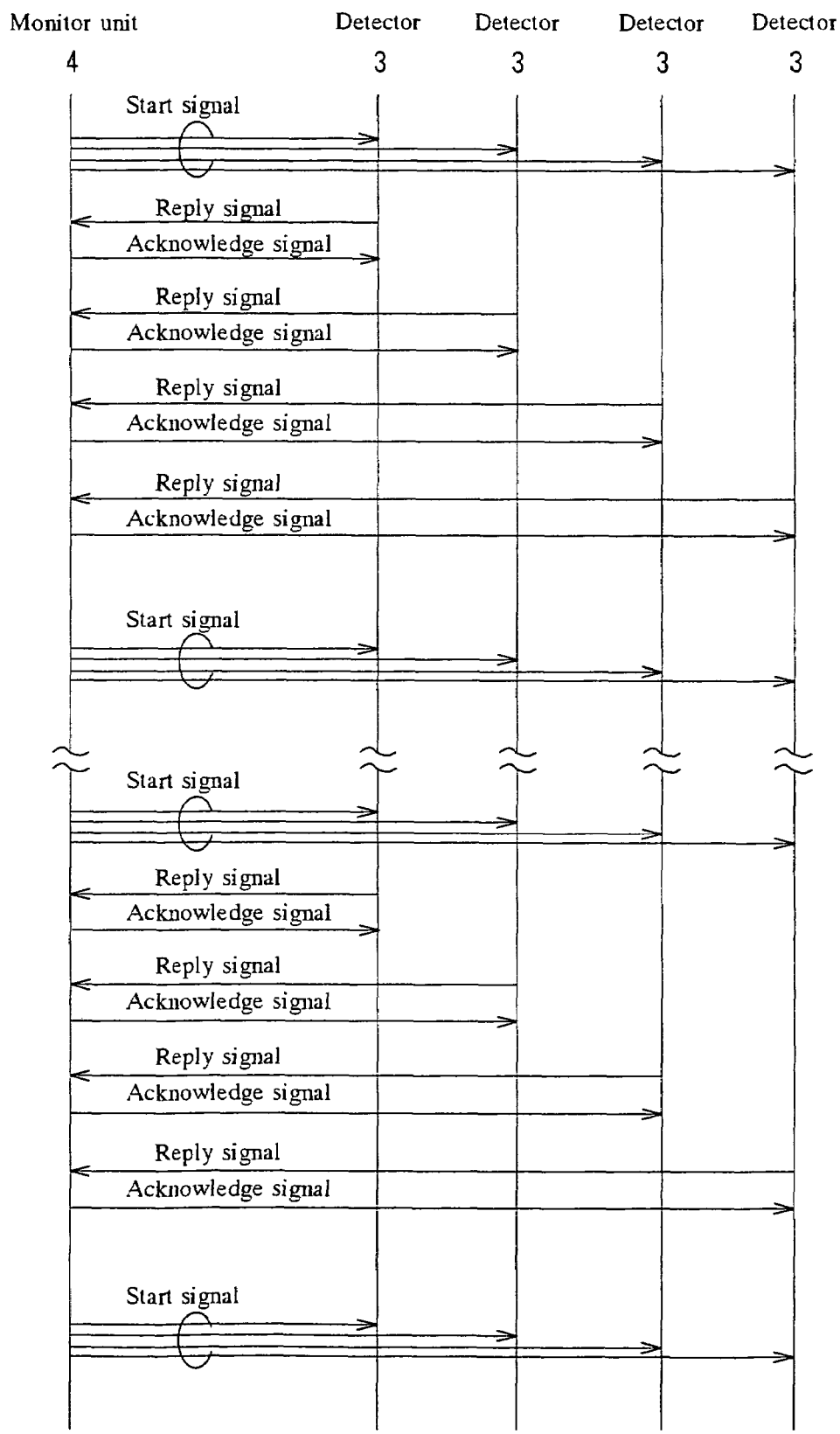
FIG. 6 is a diagram showing transmission timing of the start signal and reply signal according to the first embodiment of the present invention.
Figure 9:
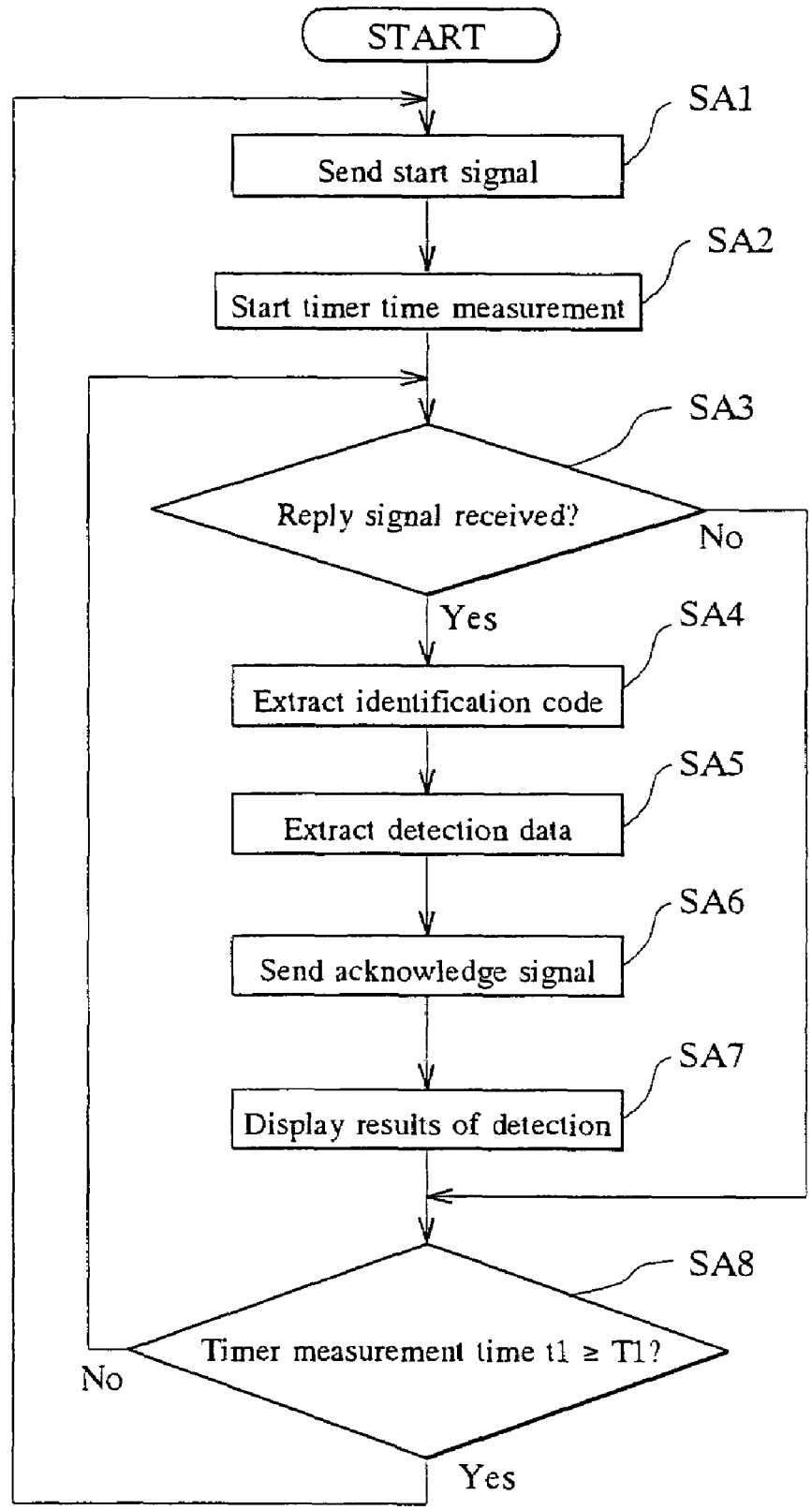
FIG. 9 is a flowchart for explaining an operation of the monitor unit according to the first embodiment of the present invention.
Figure 10:
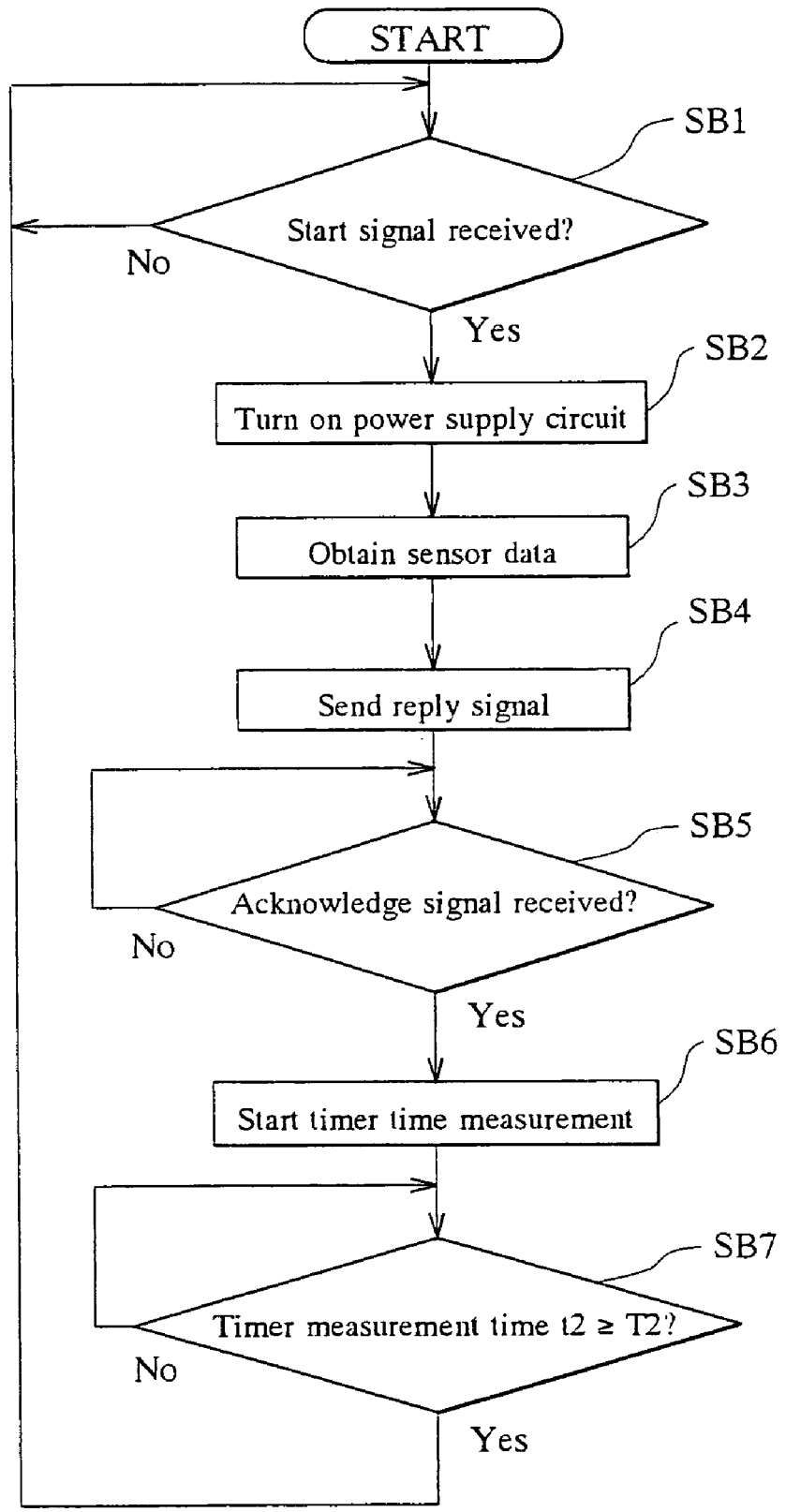
FIG. 10 is a flowchart for explaining an operation of the detector according to the first embodiment of the present invention.

The monitor unit 4 operates only while power is being supplied from the battery 6 to the monitor unit 4 after the ignition key 7 of the vehicle 1 is operated. After starting operation, the monitor unit 4 sends a start signal (SA1) and resets a timer to start timekeeping (SA2) at time intervals T1, as shown in FIGS. 5, 6, and 9.

Figure 7:
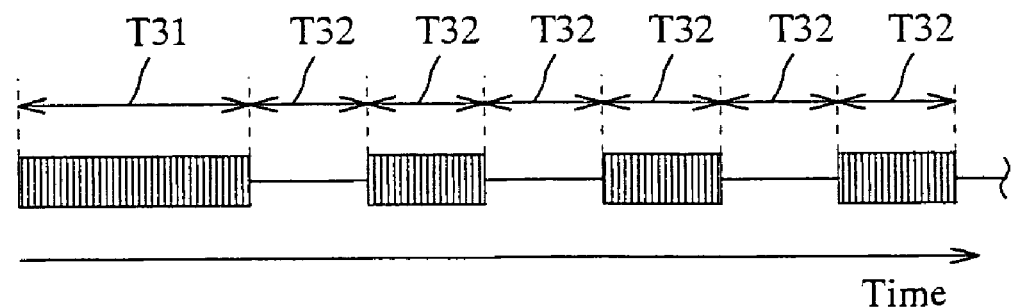
FIG. 7 is a diagram for explaining the header part of the start signal according to the first embodiment of the present invention.

The start signal consists of a header part followed by an information part. The header part is used for providing electric power to the detectors 3 and consists of four carrier signals as shown in FIG. 7. After carrier signal is sent for time T31, three carriers are intermittently sent for time T32 at time intervals T32. According to the present embodiment, the carrier signals are sent on an intermittent basis as described above so that the start signal can be distinguished from noise. According to the present embodiment, first carrier signal time T31 is set to 100 ms so that the detector 3 can start operation by the first carrier signal. Furthermore, the second and subsequent carrier signal times T32 are set to 50 ms so that the detector 3 can continue to operate at least for one second.

Figure 8:
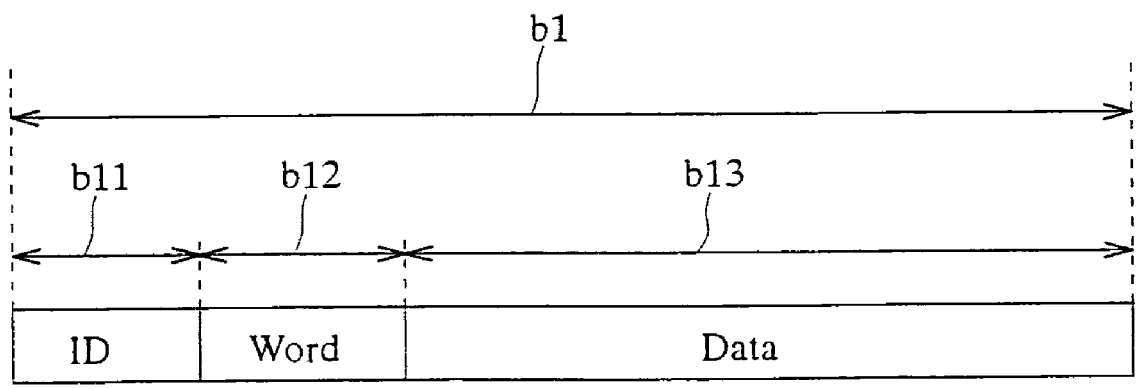
FIG. 8 is a diagram for explaining an information part of the start signal according to the first embodiment of the present invention.

The start signal information part consists of b1-bit binary data consisting of a b11-bit ID part followed by b12-bit word part and b13-bit data part, as shown in FIG. 8. According to the present embodiment, the ID part consists of 4 bits, word part consists of 4 bits, and data part consists of 42 bits. All of the detectors 3 or one or more particular detectors 3 can be specified by the setting in the ID part. Setting in the word part can specify the content of an instruction or data. Data associated with the setting in the word part is set in the data part.

When the start signal is sent from the monitor unit 4, the carrier signal in the header part of the start signal causes a high-frequency electromotive force at the antenna 31 in each detector 3 and this energy is rectified and smoothed by the rectifier circuit 33 into electric energy, which is stored in the capacitor 333. This causes electric power to be supplied to the central processing section 34, detector section 35, and the transmitting section 36 in the detector 3 to cause these electronic circuits to start operation.

The CPU 341 in the detector 3, which started to operate, recognizes that the start signal is received (SB1), then places the FET 382 in the on state (SB2) to start supplying power from the battery 381 to the sensor section 37. In addition, it controls and switches the selector switch 373 to obtain detection data detected by the first and second sensors 371 and 372 (SB3).

Then, the CPU 341 sends a reply signal including the obtained detection data to the monitor unit 4 (SB4). The format of the reply signal is the same as that of the information part of the above-described start signal. Its own identification data is set in the ID part of the reply signal. The word part indicates that it is a reply signal and the data part contains data on an air pressure detected by the first sensor 371 and data on a temperature detected by the second sensor 372. According to the present embodiment, time required for the detector 3 to send the 50-bit reply signal and the time required for the monitor unit 4 to send the information part of the start signal are both set to 30 ms.

After sending the start signal, the monitor unit 4 monitors whether it has received a reply signal from the detector 3 (SA3). When it has received the reply signal, it extracts an identification code from the reply signal it received (SA4) and also extracts data on detected air pressure and temperature (SA5). Then, the monitor unit 4 sends an acknowledge signal to the detector 3 from which the reply signal has been received (SA6). The acknowledge signal is the same as the information part of the above-described start signal. Identification information of the detector 3 is set in its ID part. In its word part, information indicating that the signal is an acknowledge signal is set. Nothing is set in its data part.

The monitor unit 4 then displays the detection results it received, on the display panel 450 (SA7). At this time point, the monitor unit 4 compares the detected air pressure and temperature with their thresholds, which are preset. If it determines that there are any abnormalities, it causes the LEDs 451a-451d and 452a-452d to emit red light. On the other hand, if it determines that there are no abnormalities, it causes the LEDs 451a-451d and 452a-452d to emit green light.

Then, the monitor unit 4 determines whether or not time ti measured by its timer has reached a start signal sending time intervals T1 preset in a program (SA8). If the result of the determination is that the time t1 measured by the timer has not reached the start signal sending time intervals T1, the monitor unit proceeds to the above-described step SA3. If it has reached the start signal sending time intervals T1, it proceeds to step SA1. According to the present embodiment, the start signal sending time intervals T1 are set to 1 second.

The detector 3 that has sent the reply signal monitors whether or not it has received an acknowledge signal from the monitor unit 4 (SB5). If it has received the acknowledge signal, it resets its timer to start measuring time. Then, the detector 3 determines whether or not time t2 measured by the timer has reached reply signal sending time intervals T2 (SB7). If it has reached the reply signal sending time intervals, the monitor unit 4 proceeds to the above described step SB1. According to the present embodiment, the reply signal sending time intervals T2 is set to 10 seconds. This causes the detector 3 to send the reply signal at intervals T2 (10 seconds).

As described above, the detector 3 can operate for more than 1 second on electric power obtained by receiving one start signal from the monitor unit 4. Accordingly, the detector 3 keeps operating while the monitor unit 4 is operating and, approximately one second after the monitor unit 4 stops operating, the FET 382 of the detector 3 is turned off to stop the power supply from the battery 381 to the sensor section 37.

Thus, when the vehicle 1 is not in use, that is, the ignition key 7 is in the off state and no electric power is supplied from the battery 6 to the monitor unit 4, the FET 382 is placed in the off state and therefore no electric power of the battery 381 in the sensor section 37 is consumed. This allows the sensor section 37 in the detector 3 to be started by remote control from the monitor unit 4 without unnecessarily consuming electric power stored in the battery 381.

A second embodiment of the present invention will be described below.

Figure 11:
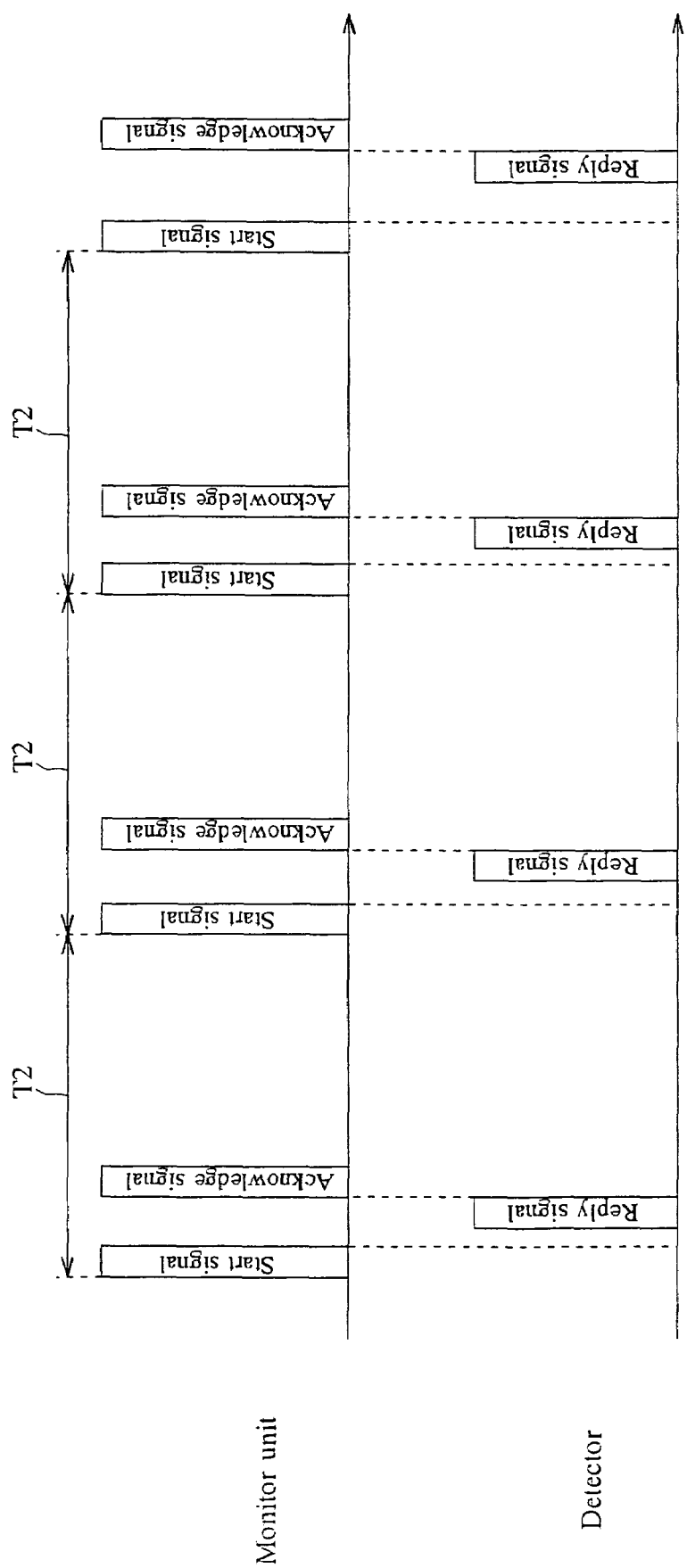
FIG. 11 is a diagram showing transmission timing of a start signal and a reply signal according to a second embodiment of the present invention.
Figure 12:
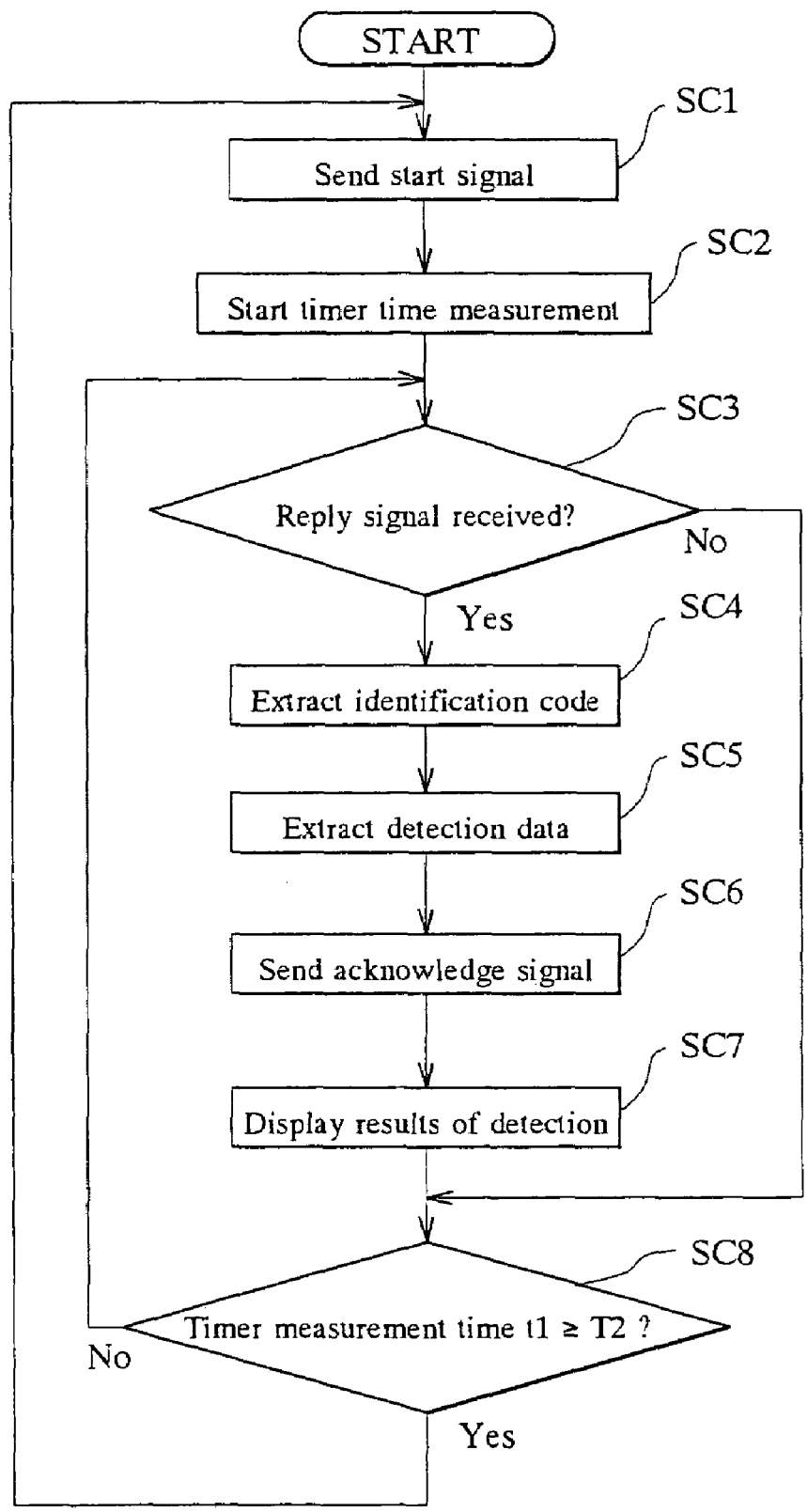
FIG. 12 is a flowchart for explaining an operation of a monitor unit according to the second embodiment of the present invention.
Figure 13:
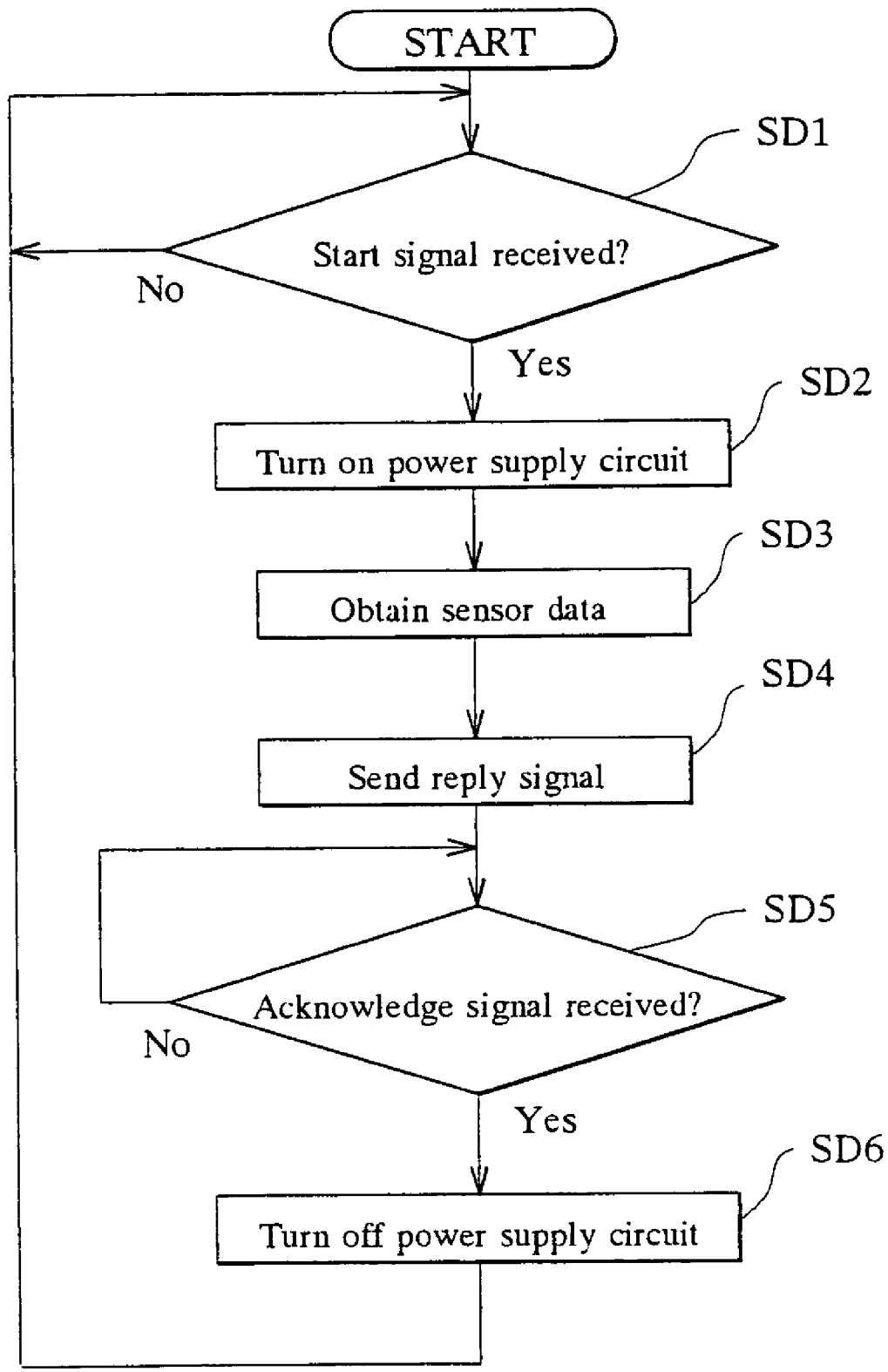
FIG. 13 is a flowchart for explaining an operation of a detector according to the second embodiment of the present invention.

FIG. 11 is a diagram showing transmission timings for a start signal and reply signal in the second embodiment, FIG. 12 is a flowchart illustrating an operation of a monitor unit, and FIG. 13 is a flowchart illustrating an operation of a detector. In these drawings, the same components as those in the first embodiment described above are labeled with the same reference numerals and the description of which will be omitted.

The second embodiment differs from the first embodiment in that a start signal is sent from the monitor unit 4 at time intervals T2 and the detector 3 places an FET 382 in the off state when it receives an acknowledge signal in the second embodiment.

That is, when starting operation, the monitor unit 4 in the second embodiment sends a start signal (SC1) and resets a timer to cause it to start measuring time (SC2) as shown in the flowchart in FIG. 12. Then, the monitor unit 4 determines whether or not it has received a reply signal from the detector 3 (SC3). If the result of the determination is that it has not received the reply signal, it proceeds to step SC8, which will be described later. If it has received the reply signal, then it extracts and stores an identification code from the received reply signal (SC4), extracts data on detected air pressure and temperature (SC5), and sends an acknowledge signal to the detector 3 from which it has received the reply signal (SC6). After displaying the received detection result on its display panel 450 (SC7), the monitor unit 4 determines whether or not the time t1 measured by the timer has reached start signal sending time intervals T1 (SA8). If the result of the determination is that the time t1 measured by the timer has not reached the start signal sending time intervals T1, the monitor unit 4 proceeds to the above-described step SC3. If time t1 has reached time T1, it proceeds to the above-described step SC1.

When the detector 3 in the second embodiment recognizes reception of a start signal (SD1), it places the FET 382 in a power supply section 38 in the on state (SD2) to start power supply from a battery 381 to a sensor section 37 and obtains detection data detected by a first sensor 371 and a second sensor 372 (SD3).

Then, a CPU 341 of the detector 3 sends a reply signal including the obtained detection data (SD4), and then determines whether or not it has received an acknowledge signal from the monitor unit 4 (SD5) and, if it has received the acknowledge signal, places the FET 382 in the off state (SD6) and proceeds to the above-described step SD1.

According to the configuration of the second embodiment described above, the detector 3 is operated for approximately one second at time intervals T2 and in the non-operation state during the remaining time. Accordingly, the FET 382 of the detector 3 can be kept in the off state and power supply from the battery 381 to the sensor section 37 can be kept stopped during the non-operation state of the detector 3, enabling a longer life of the battery 381 than in the first embodiment.

Figure 14:
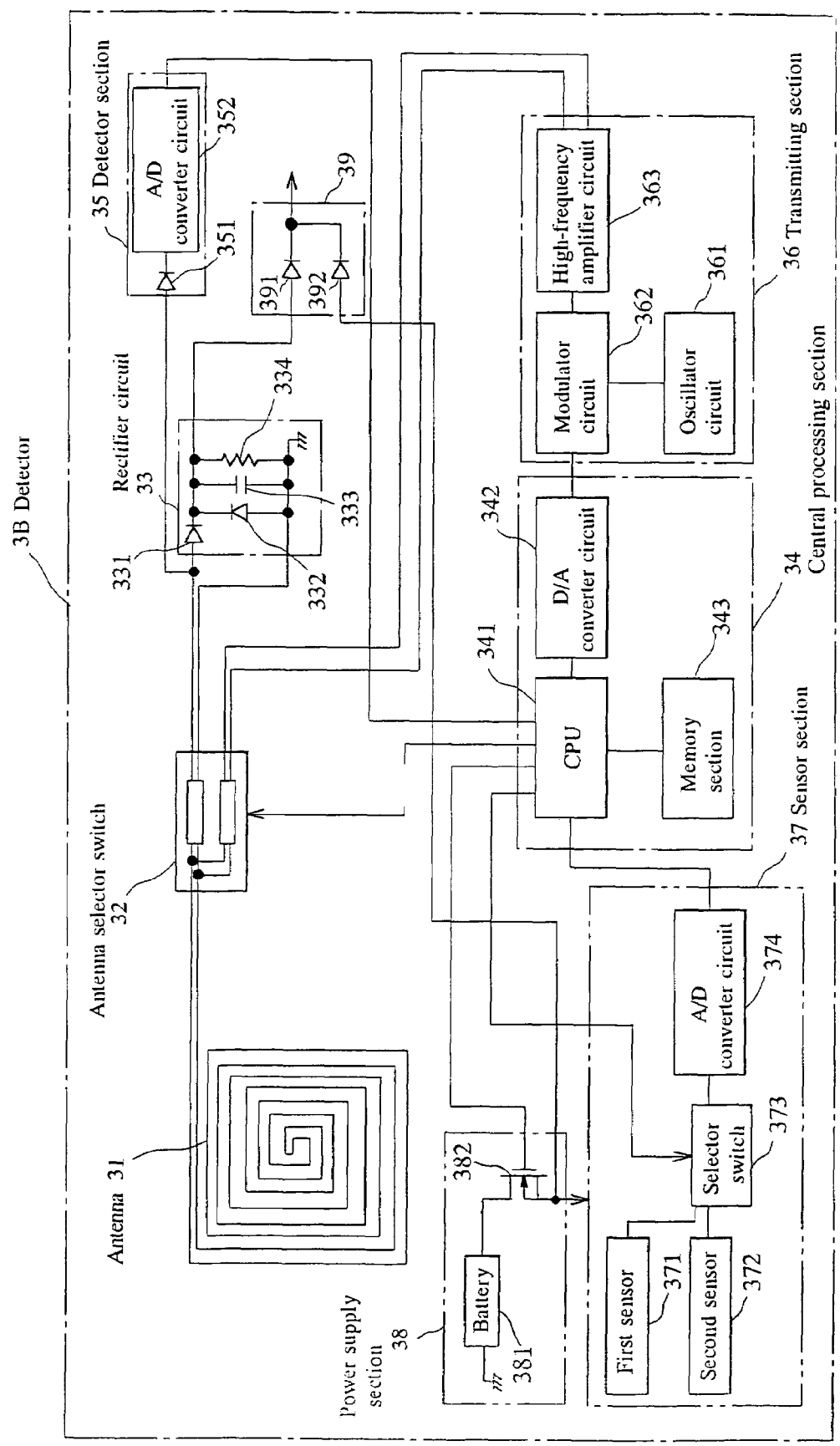
FIG. 14 is a block diagram of an electric system circuitry of a detector according to a third embodiment of the present invention.

In the second embodiment, the reply signal may be repeatedly sent at predetermined time intervals until the detector 3 receives the acknowledge signal. In case the detector 3 cannot obtain the acknowledge signal in one second or fewer after it receives a start signal, that is, within a time period in which it can operate by means of energy of a start signal, a diode OR circuit is provided in the detector 3 and operating power is supplied from a rectifier circuit 33 through a first diode 391 and from the source of the FET 382 through a second diode 392 to a central processing section 34, detector section 35 and a transmitting section 36 as in a third embodiment shown in FIG. 14.

As described above with respect to first through third embodiments by way of example, according to the vehicle tire monitoring system of the present invention, energy of a start signal sent from a monitor unit 4 causes electric energy to be supplied to operate a CPU 341 in a detector 3 and the CPU 341 places an FET 382 in the on state based on the start signal so that electric power is supplied from a battery 381 to a sensor section 37 to be operated through the FET 382, therefore, while the FET 382 is in the off state and the sensor section 37 is in the non-operation state, no electric power of the battery 381 is consumed in the sensor section 37. Thus, operation of the sensor section 37 can be started by remote control from the monitor unit 4 without unnecessarily consuming electric power.

A fourth embodiment of the present invention will be described below.

Figure 15:
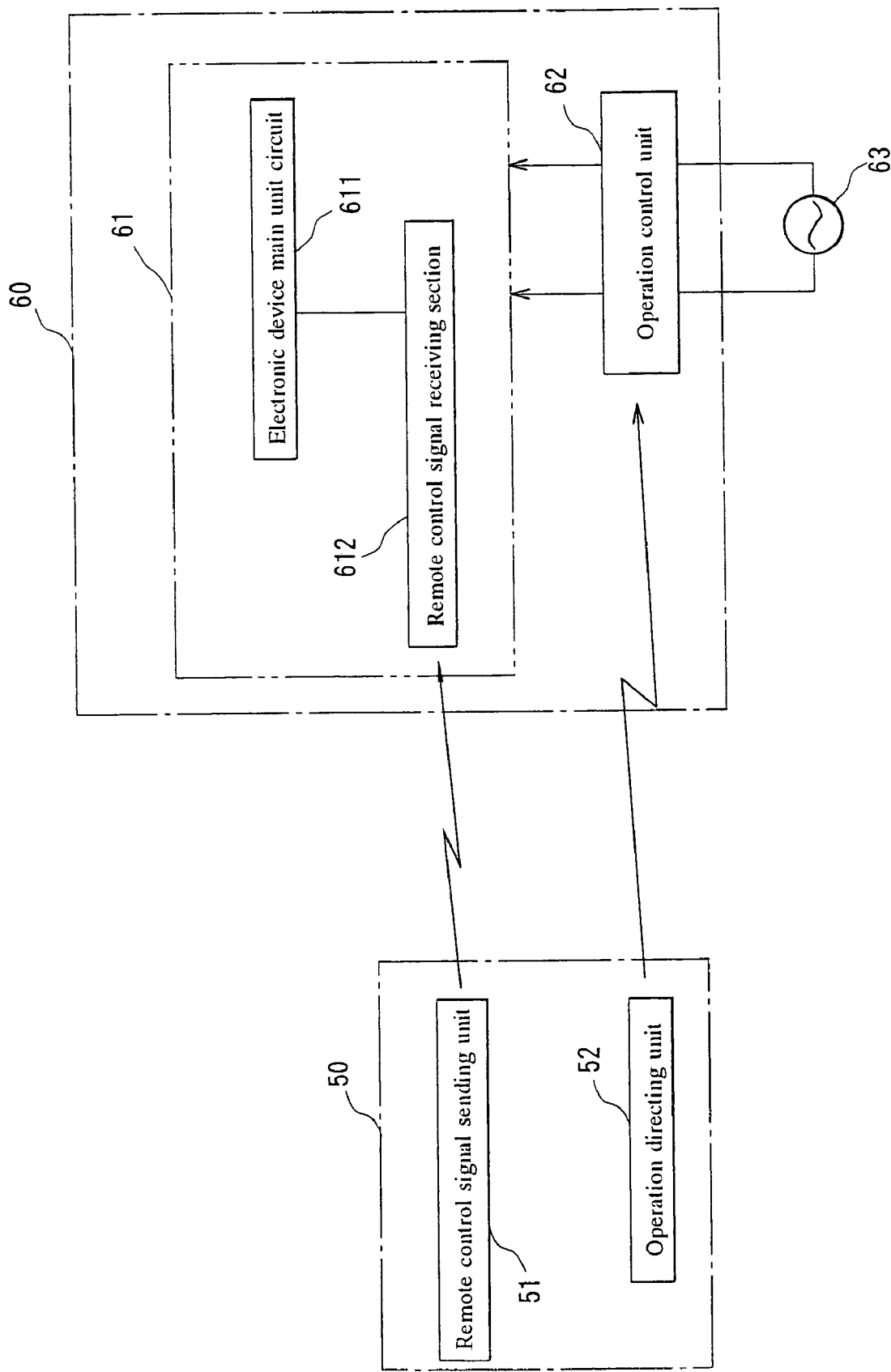
FIG. 15 is a block diagram showing an electronic device including an electronic device starter according to a fourth embodiment of the present invention.
Figure 16:
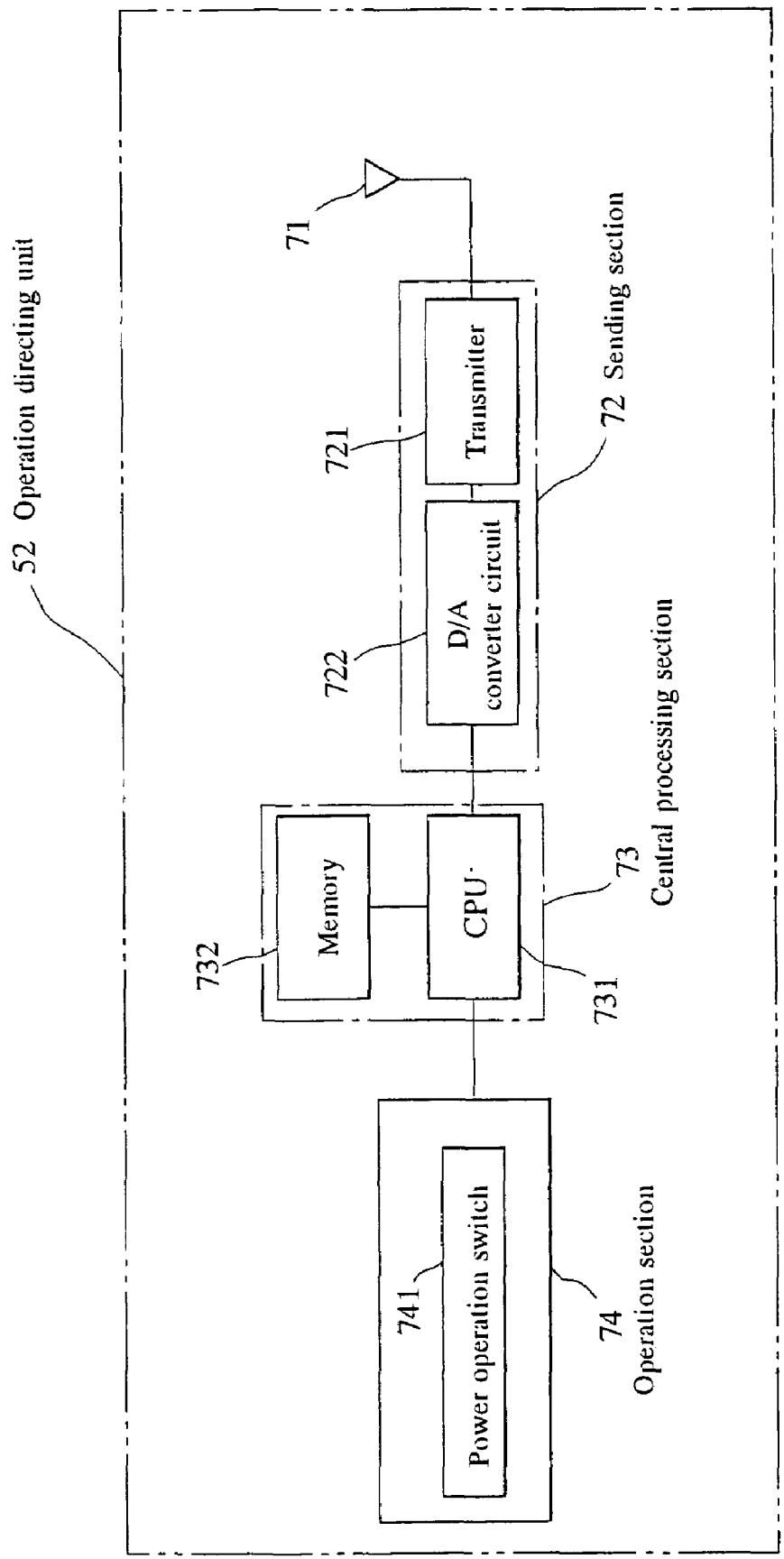
FIG. 16 is a block diagram showing an electric system circuitry of an operation directing unit according to the fourth embodiment of the present invention.
Figure 17:
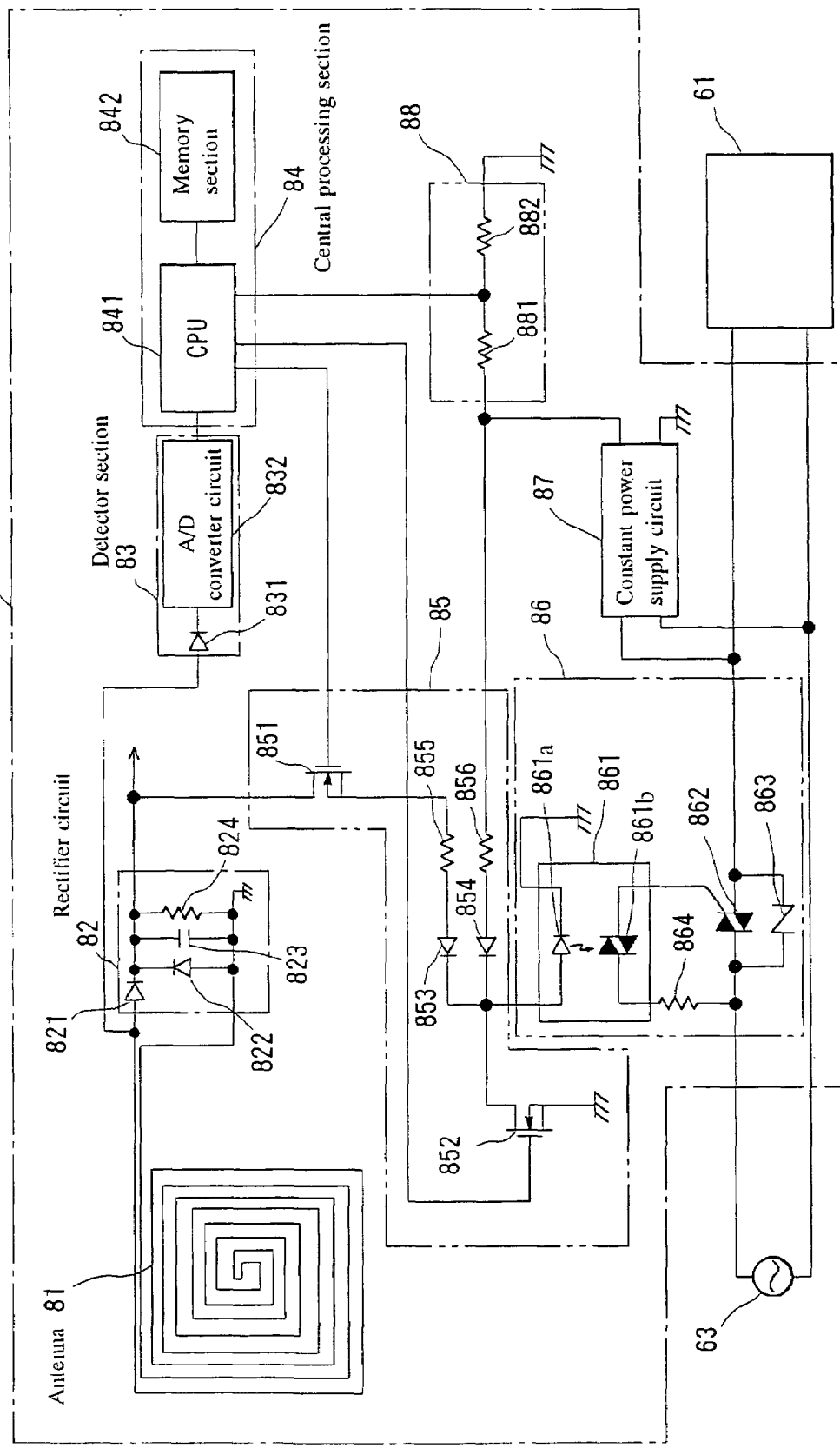
FIG. 17 is a block diagram showing an electric system circuitry of an operation control unit according to the fourth embodiment of the present invention.

FIG. 15 is a block diagram showing an electronic device including an electronic device starter according to the fourth embodiment, FIG. 16 is a configuration diagram of an electric system circuitry of its operation directing unit, and FIG. 17 shows an electric system circuitry of its operation control unit. In these drawings, reference numeral 50 indicates a remote control unit and reference numeral 60 indicates the electronic device. The electronic device 60 may be a television, stereo, or an audio device such as a video recorder/player, for example.

The remote control unit 50 consists of a hand-held casing (not shown), a well-known remote control signal sending unit 51 that is contained in the casing and uses infrared rays, and an operation directing unit 52 of the present invention. The audio device 60 comprises a device main unit 61 consisting of an electronic device main unit circuit 611 and a remote control signal receiving section 612 and an operation control unit 62 of the present invention. Electric power is supplied from a commercial alternating current power source 63 to the device main unit 61 of the audio device 60 through the operation control unit 62.

The operation directing unit 52 of the remote control unit 50 comprises an antenna 71, a sending section 72, a central processing section 73, and an operation section 74 as shown in FIG. 16.

The antenna 71, which is used for sending a start signal to the operation control unit 62 via electromagnetic waves, is tuned to a predetermined communication frequency in the 415 MHz, for example, as in the first embodiment.

The sending section 72 comprises a transmitter 721 and a D/A converter circuit 722, converts a start signal inputted from the central processing section 73 into a high-frequency signal, and outputs it to the antenna 71.

The central processing section 73 comprises a well-known CPU 731 and memory 732 and sends a start signal when a power operation switch 741 in the operation section 74 is pressed. The start signal in the present embodiment is composed only of a header part of the start signal described in the first embodiment.

The operation section 74 includes a momentary power-operation switch 741, which is exposed to be operated at the surface of the casing of the unit 50 and presented as a power switch.

The operation control unit 62 comprises an antenna 81, a rectifier circuit 82, a detector section 83, a central processing section 84, a switching operation section 85, a switch section 86, a constant power supply circuit 87, and a voltage detector circuit 88 as shown in FIG. 17.

The antenna 81, which is used for receiving a start signal sent from the operation directing unit 52, is tuned to a predetermined communication frequency, which may be 415 MHz, for example.

The rectifier circuit 82 is formed by a well-known full-wave rectifier circuit comprising diodes 821 and 822, a capacitor 823, and a resistor 824. The antenna 81 is connected to the input of the rectifier circuit 82. The rectifier circuit 82 rectifies a high-frequency current induced at the antenna 81 into a direct current and outputs the direct current as current for operating the detector section 83 and the central processing section 84.

The detector section 83 comprises a diode 831 and an A/D converter circuit 832. The anode of the diode 831 is connected to the antenna 81 and its cathode is connected to the CPU 841 in the central processing section 84 through the A/D converter circuit 832. Thus, a received signal is converted into digital data by the detector section 83 and inputted into the CPU 841.

The central processing section 84 comprises a well-known CPU 841 and a memory section 842. The CPU 841 operates based on a program stored in a semiconductor memory of the memory section 842. This program causes the CPU 841 to be supplied with power to start operating. If the CPU 841 detects a start signal while power is being supplied from a commercial electric power source 63 to the device main unit 61, turns on/off the switch section 86 to shut off power from the commercial electric power source 63 to the device main unit 61. In addition, when the CPU 841 detects a start signal while no power from the commercial electric power source 63 is being supplied to the device main unit 61, the CPU 841 turns on/off the switch section 86 so that power is supplied from the commercial electric power source 63 to the device main unit 61.

The switching operation section 85 comprises N-channel FETs 851 and 852, diodes 853 and 854 and resistors 855 and 856. The drain of the first FET 851 is connected to the positive output of the rectifier circuit 82 and its source is connected to the anode of the first diode 853 through the resistor 855. An active-high control signal outputted from the CPU 841 is inputted to the gate of the first FET 851. The drain of the second FET 852 is connected to the cathodes of the first and second diodes 853 and 854 and the source is grounded. An active-high control signal outputted from the CPU 841 is inputted to the gate. The anode of the second diode 854 is connected to the positive output of the constant power supply circuit 87 and the voltage detector circuit 88 through the resistor 856.

The switch section 86 comprises a phototriac 861, a triac 862, a surge absorber 863 such as ZNR (registered trademark), and a register 864. The phototriac 861 comprises an LED 861a for trigger and a triac 861b which is triggered by light emitted from the LED 861a. The cathode of the LED 861a of the phototriac 861 is grounded and the anode is connected to the cathodes of the first and second diodes 853 and 854. A first anode of the triac 861b is connected to the gate of the triac 862 and a second anode of the triac 861b is connected to a second anode of the triac 862 through the resistor 864.

A first anode of the triac 862 is connected to one input terminal of the constant power supply circuit 87 and to one power input terminal of the device main unit 61.

One end of the ZNR 863 is connected to the first anode of the triac 862 and the other end is connected to the second anode of the triac 862.

One end of the commercial alternating current power source 63 is connected to the second anode of the triac 862 and the other end is connected to the other input terminal of the constant power supply circuit 87 and the other power input terminal of the device main unit 61.

The constant power supply circuit 87 is capable of outputting a current that has a current value equal to or higher than a current value that the rectifier circuit 82 can output and is enough to cause the LED 861a of the phototriac 861 to emit light to place the triac 861b in the on state.

The voltage detector circuit 88 is composed of two resistors 881 and 882 connected in series. One end of the series of the two resistors 881 and 882 is connected to the positive output terminal of the constant power supply circuit 87 and the other end is grounded. The connecting point between one resistor 881 and the other resistor 882 is connected to the input port terminal of the CPU 841. The CPU 841 detects the on/off state of the triac 862 by detecting whether the voltage level output from the voltage detector circuit 88 is high or low.

The configuration described above allows electric power from the commercial alternating current power source 63 to be supplied to the device main unit 61 to cause the device main unit 61 to operate when the triac 862 is in the on state. When the triac 862 is in the off state, power from the commercial alternating current power source 63 to the device main unit 61 is shut off.

Figure 18:
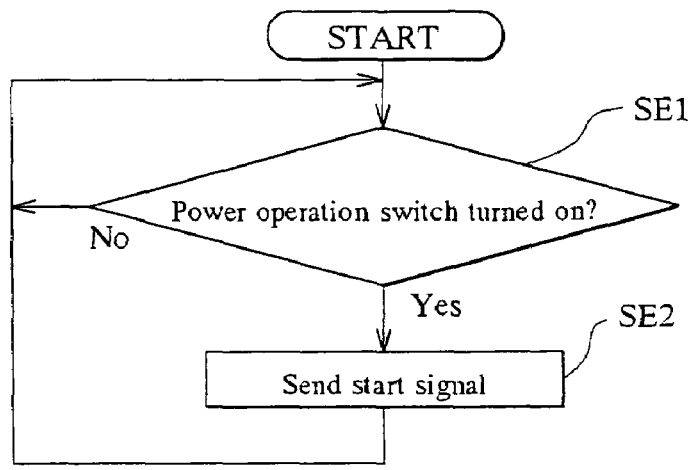
FIG. 18 is a flowchart for explaining an operation of the operation directing unit according to the fourth embodiment of the present invention.
Figure 19:
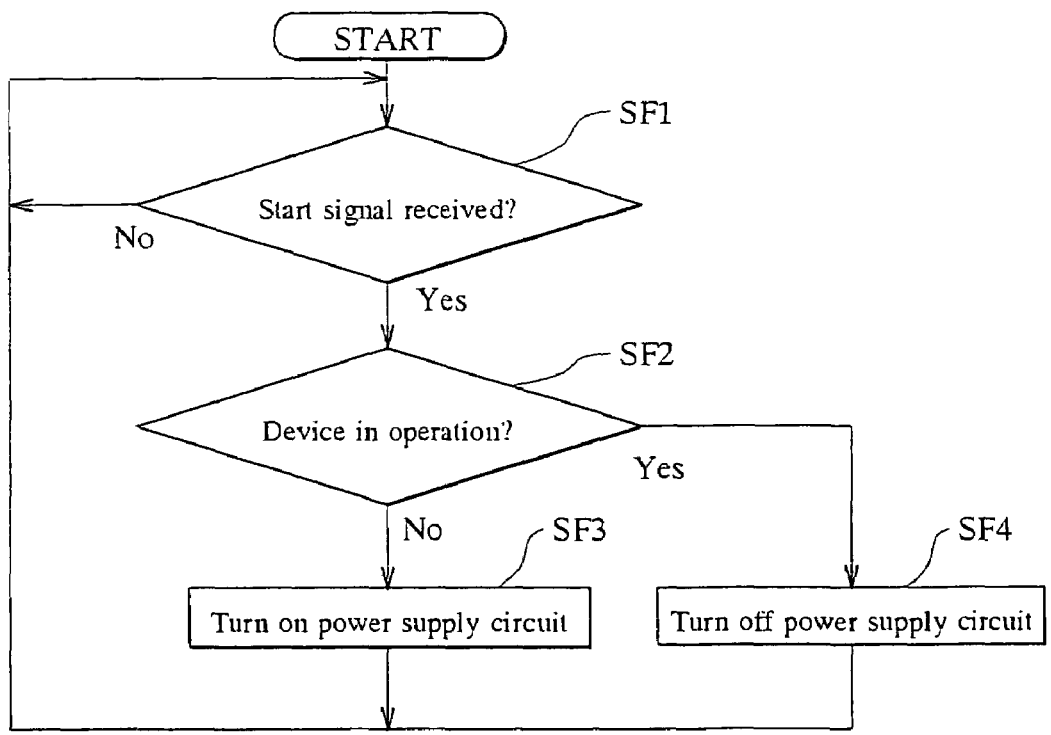
FIG. 19 is a flowchart for explaining an operation of the operation control unit according to the fourth embodiment of the present invention.

Details of remote control for turning on/off the device main unit 61 by means of the operation directing unit 52 and the operation control unit 62 of the present invention will be described below with reference to flowcharts in FIGS. 18 and 19.

According to the present embodiment, the audio device 60 can be turned on/off by pressing the operation switch 741 on the remote control unit 50 to momentarily flip it on, as described above.

The CPU 731 of the operation directing unit 52 monitors whether the power operation switch 741 is turned on (SE1) and, if it is turned on, sends a start signal (SE2).

When the start signal is sent from the operation directing unit 52, a high-frequency electromotive force is induced at the antenna 81 in the operation control unit 62 by a carrier signal of the start signal, its energy is rectified and smoothed by the rectifier circuit 82 into electric energy, and stored in the capacitor 823. This causes electric power to be supplied to the detector section 83 and the central processing section 84 in the operation control unit 62 to cause these electronic circuits to start operating.

When the CPU 841 of the operation control unit 62, which starts operating, recognizes the reception of the start signal (SF1), it determines based on the level of a voltage outputted from the voltage detector circuit 88 whether or not the device main unit 61 is in operation, that is, the triac 862 is in the on state (SF2). If it is determined that the level of the voltage outputted from the voltage detector circuit 88 is low and therefore no power is being supplied to the device main unit 61, the CPU 841 places the FET 851 in the on state to start power supply from the commercial alternating current power source 63 to the device main unit 61 (SF3). On the other hand, if the level of the voltage outputted from the voltage detector circuit 88 is high and therefore power is being supplied to the device main unit 61, then the CPU 841 places the FET 852 in the on state to shut off power supply from the commercial alternating current power source 63 to the device main unit 61 (SF4).

When the FET 851 is placed in the on state by the above-described step SF3, current is conducted to the LED

861a of the phototriac 861 through the FET 851, resistor 855, and diode 853 to cause the LED 861a to emit light and turn on the triac 861b. This triggers the gate of the triac 862 through the on-state triac 861b and resistor 864 to turn on the triac 862.

When the triac 862 is turned on, electric power is supplied to the constant power supply circuit 87 and the device main unit 61 through the triac 862 and to cause the device main unit 61 to start operating and current is conducted to the switching operation circuit 85 and the voltage detector circuit 88 from the constant power supply circuit 87. This causes the current to be conducted to the LED 861a of the phototriac 861 through the resistor 856 and diode 854 from the constant power supply circuit 87.

Thus, after the electric power stored in the capacitor 823 of the rectifier circuit 82 is exhausted and the operation of the CPU 841 stops, the phototriac 862 is still kept in the on state to keep supplying power to the device main unit 61.

On the other hand, if the FET 852 is placed in the on state by the above-described step SF4, the anode of the LED 861a is grounded through the FET 852 to turn off the LED 861a. This places the triac 861b in the off state. When the triac 861b is placed in the off state, the trigger input into the gate terminal of the triac 862 is lost to turn off the triac 862, shutting off the power supply from the commercial alternating current power source 63 to the device main unit 61. Thus, once the triac 862 is turned off and the power supply from the commercial alternating current power source 63 to the device main unit 61 is shut off, no power is consumed in the audio device 60.

A clock circuit in the device main unit 61 for measuring time may be operated on a rechargeable secondary battery and time of day may be displayed by using electric power from the secondary battery or may be displayed on a display only while the device main unit 61 is being supplied with power from the commercial alternating current power source 63.

If additional output power from the rectifier circuit 82 is desirable, a solar battery may be connected in parallel with the output of the rectifier circuit 82 as an auxiliary power supply. Furthermore, wave energy of light or sound in the ambient atmosphere may be converted into electric energy to use as the auxiliary power supply.

Figure 20:
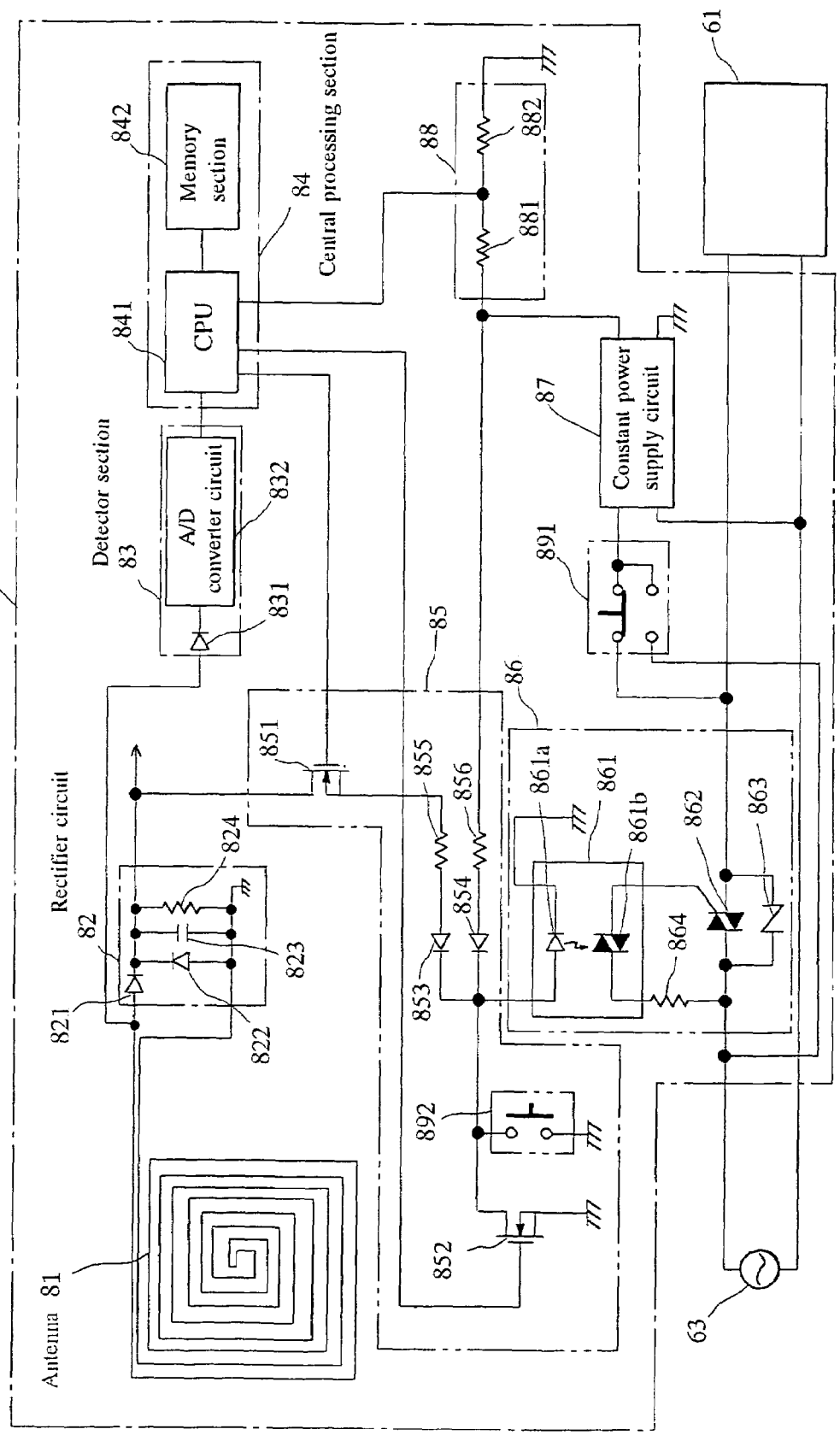
FIG. 20 is a block diagram showing an electric system circuitry of the operation control unit in which a manual switch is provided according to the fourth embodiment of the present invention.

If it is desirable to provide a manual power switch in the configuration shown in FIG. 17, an on switch 891 and off switch 892 may be provided as shown in FIG. 20. The on switch 891 is interposed between one input terminal of the constant power supply circuit 87 and the triac 862 so that the constant power supply circuit 87 is connected with the second anode of the triac 862 (on the commercial-alternating-current-power-source 63 side) when it is depressed and otherwise with the first anode (on the device main unit 61 side) of the triac 862. Here, it is preferable that the capacity of the capacitor at the output of a smoothing circuit of the constant power supply circuit 87 be set large enough to avoid a reduction in output power from the constant power supply circuit 87 on switching of the on switch 891. The off switch 892 is composed of a momentary switch connected across and in parallel with the drain and source of the FET 852.

While the start signal in the fourth embodiment is composed of only the header part of the start signal in the first embodiment, a start signal may be used that is composed of a header part and an information part, like the start signal in the first embodiment, so that identification information can be used to select an electronic device to be powered on/off if there are a plurality of electronic devices.

While the same start signal is used to start and end the operation of an electronic device, that is, to power on and off the electronic device in the fourth embodiment, a start signal similar to the one used in the first embodiment may be used, and in addition, a power on switch and a power off switch may be provided in the operation directing unit, switching information for specifying power on and off may be stored in the word part of the start signal, and the operation control unit 62 may control switching of the switch section 86 based on the switching information. In this case, the start signal spacing power off would be a shutdown signal.

A fifth embodiment of the present invention will be described below.

Figure 21:
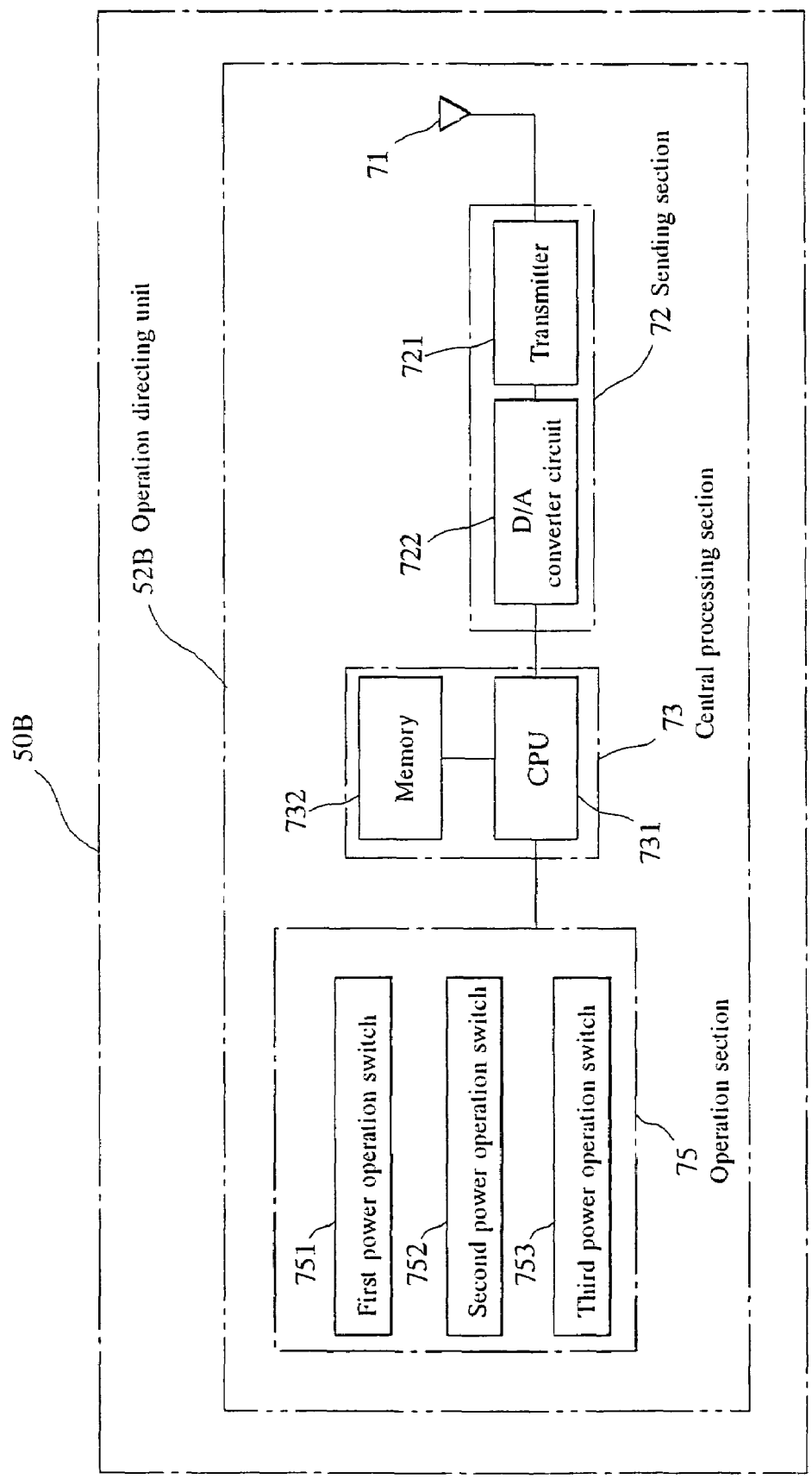
FIG. 21 is a block diagram of an electric system circuitry of an operation directing unit according to a fifth embodiment of the present invention.
Figure 22:
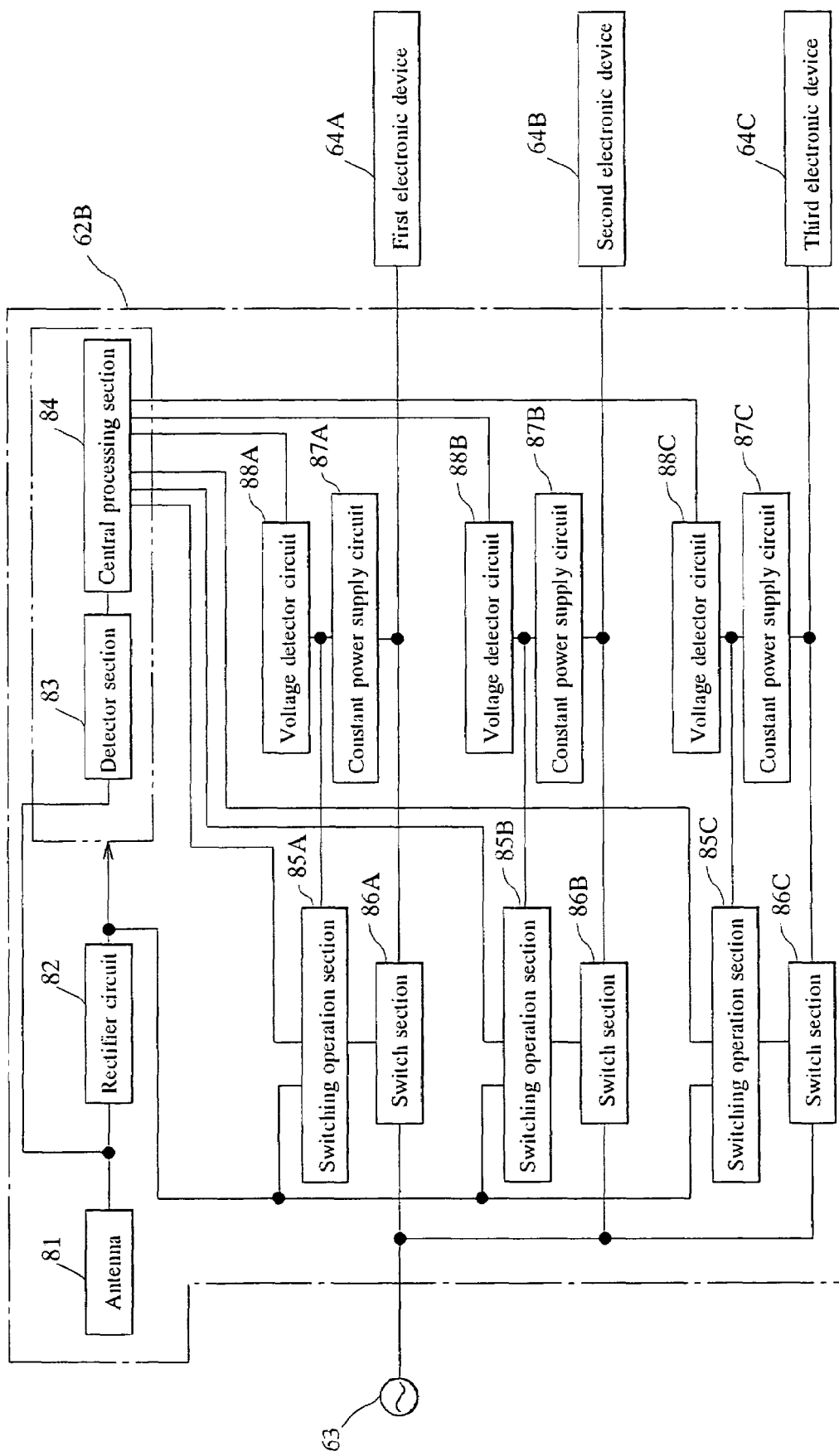
FIG. 22 is a block diagram of an electric system circuitry of an operation control unit according to the fifth embodiment of the present invention.

FIG. 21 is a block diagram of electric system circuitry of an operation directing unit 52B according to the fifth embodiment and FIG. 22 is a block diagram of an electric system circuitry of an operation control unit 62B according to the fifth embodiment. In the diagrams, the same components as those in the fourth embodiment described above are represented by the same reference numerals and the description of which will be omitted. The fifth embodiment differs from the fourth embodiment in that the power on and off of three electronic devices 64A-64C can be switching-controlled by wireless remote control from the operation directing unit 52B in the fifth embodiment. In addition, a remote control unit 50B is provided that contains only the operation control unit 52B in a casing and three lighting apparatuses installed in a living room represent first through third electronic devices 64A-64C in the fifth embodiment.

That is, the operation directing unit 52B in the fifth embodiment has a configuration including an operation section 75 containing three power operation switches 751-753, in place of the operation section 74 of the operation directing unit 52 of the fourth embodiment.

Furthermore, a central processing section 73 identifies one of the first through third power operation switches 751-753 that is turned on and sends a start signal including identification information about the corresponding one of the first through third electronic devices 64A-64C associated with the first through third power operation switches 751-753.

The start signal generated by the central processing section 73 is composed on a header part and an information part, like the first embodiment described above, and identification information about one of the electronic devices 64A-64C that is to be operated is contained in the ID part.

The operation control unit 62B in the fifth embodiment comprises, besides the configuration of the operation control unit 62 in the fourth embodiment, additional two sets of a switching operation section 85, a switch section 86, a constant power supply circuit 87, and a voltage detector circuit 88, that is, three sets in total. Each of the three switch sections 86A-86C is connected interposedly between the power supply terminal of corresponding one of the first through third electronic devices 64A-64C and a commercial alternating current power source 63.

In the fifth embodiment, identification information about the first through third electronic devices 64A-64C is pre-stored in a central processing section 84 in the operation control unit 62B. The central processing section 84 detects identification information contained in a start signal it received and turns on/off the switch section 86A-86C of one of the electronic devices 64A-64C that corresponds to the identification information.

In the fifth embodiment having the configuration described above, any of the first through third power operation switches 751-753 in the remote control unit 50B can be pressed to momentarily turn it on to power on/off one of the electronic devices 64A-64C corresponding to the switch, as described above.

Figure 23:
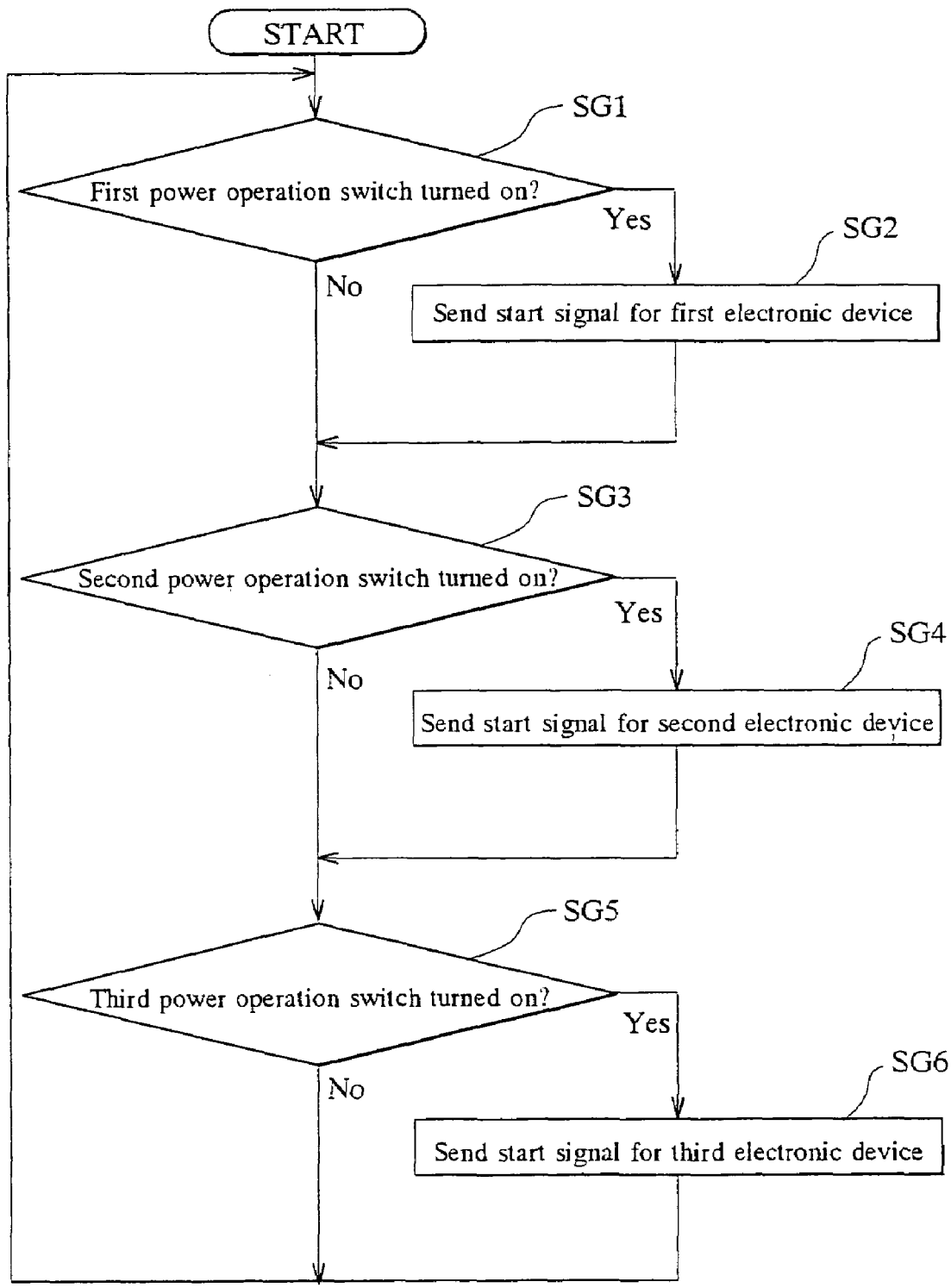
FIG. 23 is a flowchart for explaining an operation of the operation directing unit according to the fifth embodiment of the present invention.
Figure 24:
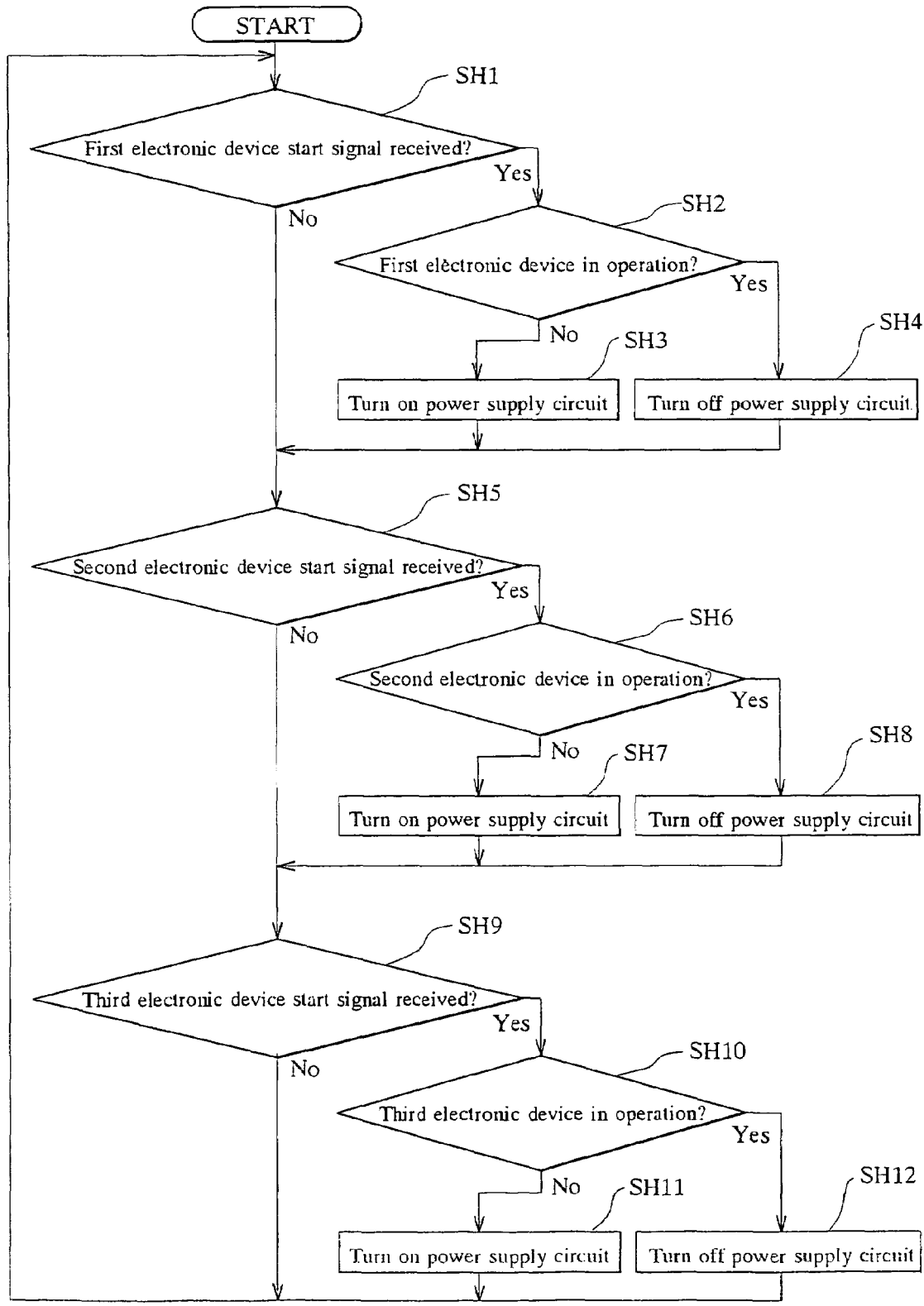
FIG. 24 is a flowchart for explaining an operation of the operation control unit according to the fifth embodiment of the present invention.

That is, the central processing sections 73 and 84 of the operation directing unit 52B and the operation control unit 62B operate as illustrated in flowcharts in FIGS. 23 and 24. The central processing section 73 of the operation directing unit 52B monitors whether any of the first through third power operation switches 751-753 (SG1, SG3, and SG5) is turned on and, if the first power operation switch 751 is turned on, sends a start signal in which the identification number of the first electronic device 64A is specified (SG2). If the second power operation switch 752 is turned on, it sends a start signal in which the identification number of the second electronic device 64B is specified (SG4). If the third power operation switch 753 is turned on, it sends a start signal in which the identification number of the third electronic device 64C is specified (SG6).

When any of the above-described start signals is sent from the operation directing unit 52B, a high-frequency electromotive force is induced at the antenna 81 by a carrier signal of the start signal in the operation control unit 62B and the energy is rectified and smoothed by the rectifier circuit 82 into electric energy, which causes electric power to be supplied to the detector section 83 and central processing section 84 to cause these electronic circuits to start operating.

When the central processing section 84 of the operation control unit 62, which has started operating, recognizes the reception of a start signal for the first electronic device (SH1), it determines based on the level of a voltage outputted from the voltage detector circuit 88A associated with the first electronic device 64A whether or not the first electronic device 64A is in operation, that is, whether the triac 862 of the switch section 86A associated with the first electronic device 64A is in the on state (SH2). If the result of the determination is that the level of a voltage outputted from the voltage detector circuit 88A is low and no power is being supplied to the first electronic device 64A, the central processing section 84 places the triac 862 in the switch section 86A corresponding to the first electronic device 64A in the on state to start power supply from the commercial alternating current power source 63 to the first electronic device 64A (SH3). If the level of the voltage outputted from the voltage detector circuit 88A is high and power is being supplied to the first electronic device 64A, the central processing section 84 places the triac 862 in the switch section 86A corresponding to the first electronic device 64A in the off state to shut off power supply from the commercial alternating current power source 63 to the first electronic device 64A (SH4).

When the central processing section 84 recognizes reception of a start signal for the second electronic device (SH5), it determines based on the level of a voltage outputted from the voltage detector circuit 88B associated with the second electronic device 64B whether or not the second electronic device 64B is in operation, that is, whether the triac 862 in the switch section 86B associated with the second electronic device 64B is in the on state (SH6). If the result of the determination is that the level of a voltage outputted from the voltage detector circuit 88B is low and no power is being supplied to the second electronic device 64B, the central processing section 84 places the triac 862 in the switch section 86B associated with the second electronic device 64B in the on state to start power supply from the commercial alternating current power source 63 to the second electronic device 64B (SH7). On the other hand, if the level of the voltage outputted from the voltage detector circuit 88B is high and power is being supplied to the second electronic device 64B, the central processing section 84 places the triac 862 in the switch section 86B associated with the second electronic device 64B in the off state to shut off the power from the commercial alternating current power source 63 to the second electronic device 64B (SH8).

When the central processing section 84 recognizes reception of a start signal for the third electronic device (SH9), it determines based on the level of a voltage outputted from the voltage detector circuit 88C associated with the third electronic device 64C whether or not the third electronic device 64C is in operation, that is, whether or not the triac 862 in the switch section 86C associated with the third electronic device 64C is in the on state (SH10). If the result of the determination is that the level of a voltage outputted from the voltage detector circuit 88C is low and no power is being supplied to the third electronic device 64C, the central processing section 84 places the triac 862 in the switch section 86C associated with third electronic device 64C in the on state to start power supply from the commercial alternating current power source 63 to the third electronic device 64C (SH11). On the other hand, if the level of the voltage outputted from the voltage detector circuit 88C is high and power is being supplied to the third electronic device-64C, the central processing section 84 places the triac 862 in the switch section 86C associated with the third electronic device 64C in the off state to shut off the power from the commercial alternating current power source 63 to the third electronic device 64C (SH12).

Because no power is consumed in the first through third electronic devices 64A-64C and the operating control unit 62B while the first through third electronic devices 64A-64C are in the non-operation state after the triacs 862 in the switch sections 86A-86C are placed in the off state by the above-described arrangement, the first through third electronic devices 64A-64C can be powered on/off by remote control from the operation directing unit 52B without unnecessarily consuming electric power.

A sixth embodiment of the present invention will be described below.

Figure 25:
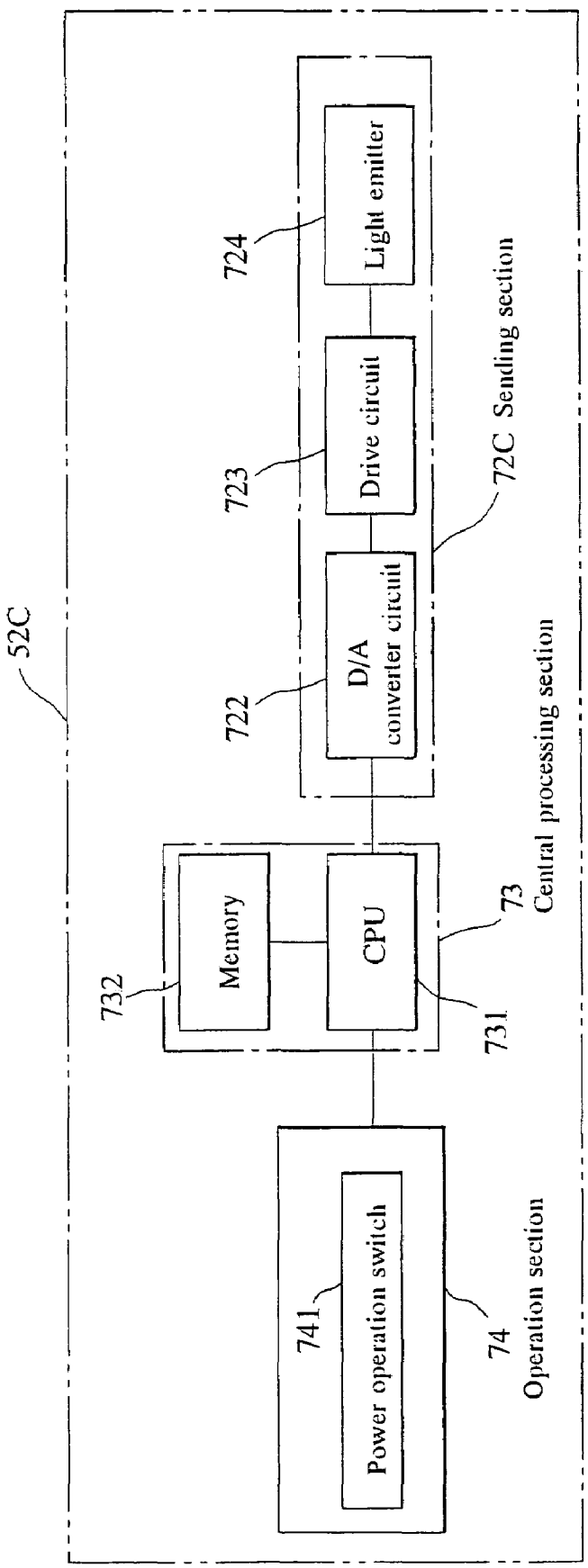
FIG. 25 is a block diagram of an electric system circuitry of an operation directing unit according to a sixth embodiment of the present invention.
Figure 26:
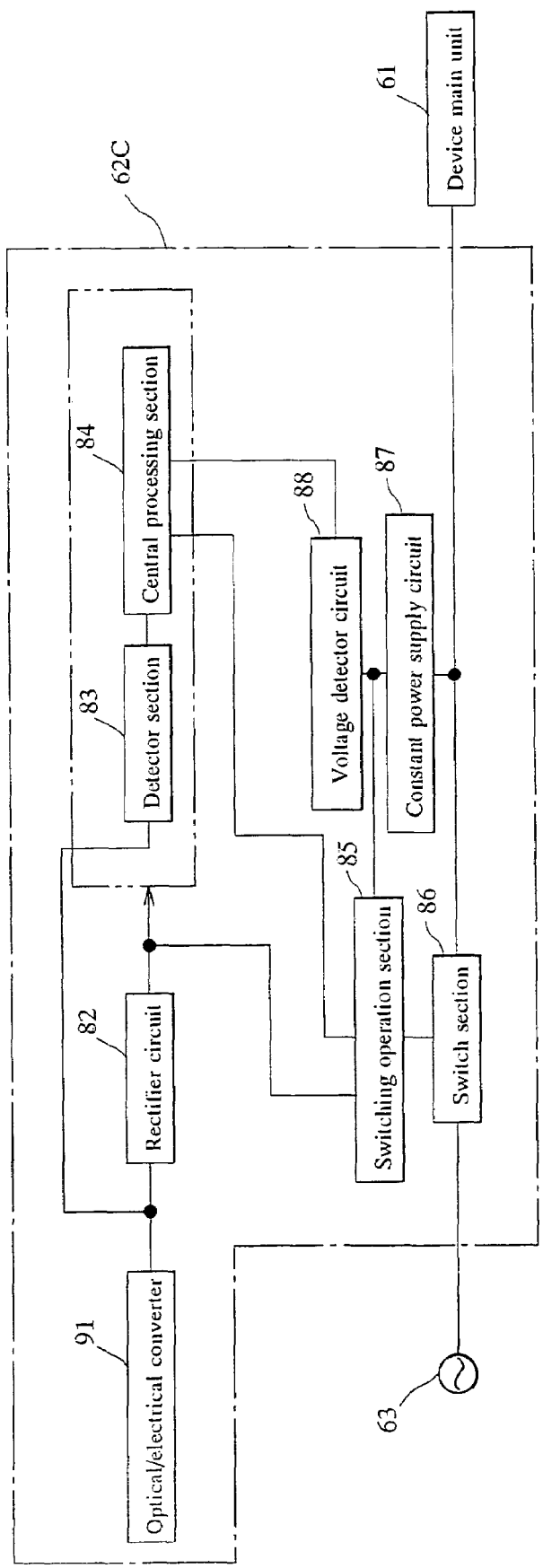
FIG. 26 is a block diagram of an electric system circuitry of an operation control unit according to the sixth embodiment of the present invention.

FIG. 25 is a block diagram showing electric system circuitry of an operation directing unit according to the sixth embodiment and FIG. 26 is a block diagram showing electric system circuitry of an operation control unit according to the sixth embodiment. In the diagrams, the same components as those in the fourth embodiment described above are labeled with the same reference numerals and the description of which will be omitted.

While in the fourth embodiment, signal transmission between the operation directing unit 52 and the operation control unit 62 is performed through electromagnetic waves, signals are transmitted through visible light or infrared rays in the sixth embodiment.

The antenna 72 and transmitter 721 used in the fourth embodiment are replaced with a drive circuit 723 and a light emitter 724 in the operation directing unit 52C according to the sixth embodiment as shown in FIG. 25. The drive circuit 723 drives the light emitter 724 based on a start signal outputted from a D/A converter circuit 722 to send a light signal corresponding to the start signal. The light emitter 724 is mainly formed by a material that emits light in accordance with an electric signal inputted into it. For example, the light emitter 724 is formed by an LED. This arrangement enables the transmission of a start signal from the operation directing unit 52C using light.

The operation control unit 62c according to the sixth embodiment comprises an optical/electrical converter 91 in place of the antenna 81 used in the fourth embodiment, as shown in FIG. 26. The optical/electrical converter 91 is mainly formed by a material that produces an electromotive force corresponding to the intensity of light when it is applied to it. The optical/electrical converter 91 may be composed of a phototransistor and a solar cell, for example. The electromotive force outputted from the optical/electrical converter 91 is inputted into a rectifier circuit 82, where it is converted into operating power for a detector section 83 and a central processing section 84. In addition, the electromotive force outputted from the optical/electrical converter 91 is inputted into the detector section 83, where a start signal is detected.

The arrangement described above allows the start signal to be transmitted from the operation directing unit 52C to the operation control unit 62C by means of light in place of electromagnetic waves. In addition, like the fourth embodiment, unnecessary electric power consumption is avoided in the sixth embodiment.

A seventh embodiment will be described below.

Figure 27:
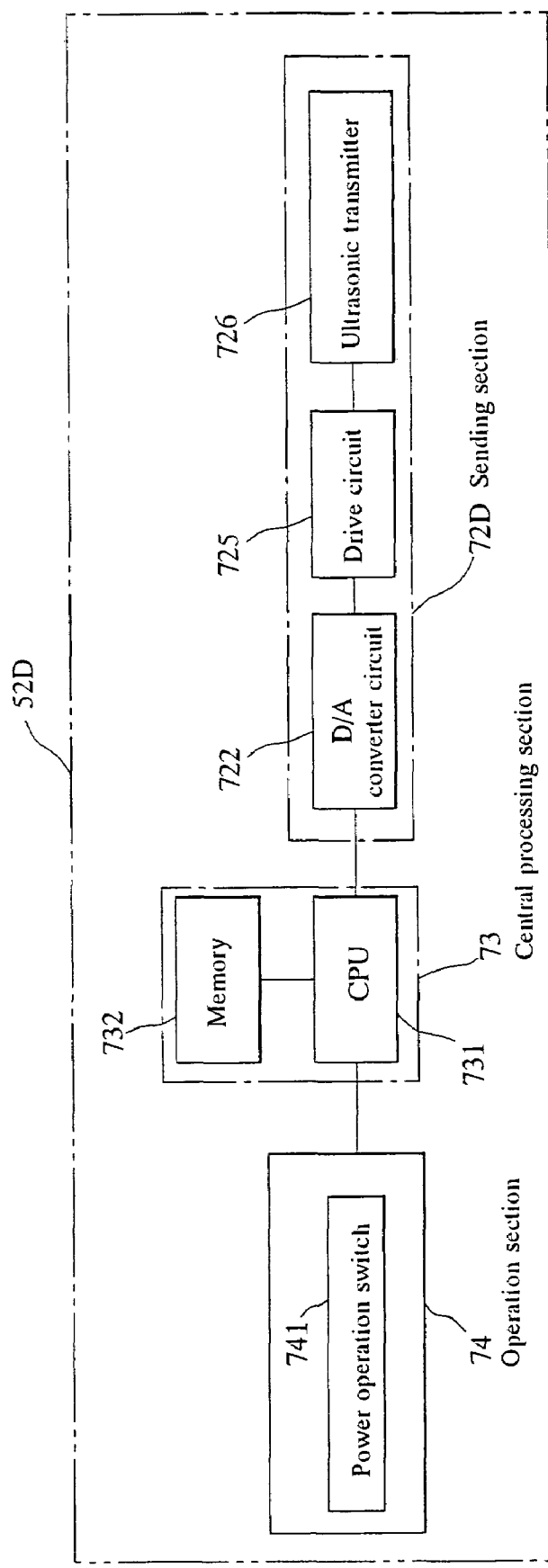
FIG. 27 is a block diagram of an electric system circuitry of an operation directing unit according to a seventh embodiment of the present invention.

FIG. 27 is a block diagram showing electric system circuitry of an operation directing unit according to the seventh embodiment and FIG. 28 is a block diagram showing electric system circuitry of an operation control unit according to the seventh embodiment. In the diagrams, the same components as those in the fourth embodiment are indicated by the same reference numerals and the description of which will be omitted.

While signal transmission between the operation directing unit 52 and the operation control unit 62 in the fourth embodiment is performed via electromagnetic waves, signals are transmitted via sound waves such as audible sound or ultrasonic waves in the seventh embodiment.

The antenna 71 and the transmitter 721 used in the fourth embodiment are replaced with a drive circuit 725 and an ultrasonic transmitter 726 in the operation directing unit 52D according to the seventh embodiment as shown in FIG. 27. The drive circuit 725 drives the ultrasonic transmitter 726 based on a reply signal outputted from a D/A converter circuit 722 to send an ultrasonic signal corresponding to a start signal. The ultrasonic transmitter 726 is mainly formed by a material that oscillates in accordance with an electric signal inputted and generates an ultrasonic wave by this oscillation. The ultrasonic transmitter 726 may be formed by a piezoelectric element, for example. The above-described arrangement enables the transmission of a start signal from the operation directing unit 52D via an ultrasonic wave.

The operation control unit 62D according to the seventh embodiment comprises an ultrasonic receiver 92 in place of the antenna 81 used in the fourth embodiment, as shown in FIG. 28. The ultrasonic receiver 92 is mainly formed by a material that oscillates in resonance with an ultrasonic signal applied to it and produces an electromotive force. The ultrasonic receiver 92 may be formed by a piezoelectric element, for example. An electromotive force outputted from the ultrasonic receiver 92 is inputted into a rectifier circuit 82, where it is converted into an operating power for a detector section 83 and a central processing section 84. In addition, the electromotive force outputted from the ultrasonic receiver 92 is inputted into the detector section 83, where a start signal is detected.

The arrangement described above enables transmission of the start signal from the operation directing unit 52D to the operation control unit 62D by using a sound wave in place of an electromagnetic wave. In addition, like the fourth embodiment, unnecessary electric power consumption is avoided in the seventh embodiment.

According to an electronic device starter of the present invention, as described with respect to the fourth to seventh embodiments by way of example, energy of a start signal sent from an operation directing unit 52 provides electric energy for operating an operation control unit 62, the operation control unit 62 places a switch section 86 in the on state based on the start signal, and electric power is supplied from a commercial electric power source 63 to the device main unit 61 through the switch section 86, therefore no electric power is consumed in the device main unit 61 and the operation control unit 62 while the device main unit 61 is in the non-operation state after the switch section 86 is placed in the off state. Thus, operation of the device main unit 61 can be started by remote control from the operation directing unit 52 without unnecessarily consuming electric power.

The first to seventh embodiments described above are only a few specific examples of the present invention and the present invention is not limited by those specific configurations.

The present invention can be implemented in various other forms without departing from the spirit and main features of the present invention. Therefore, the embodiments described above are only illustrative in every respect and should not be construed as limitative. The scope of the present invention is set forth in the Claims and not restrained by the Specification. Furthermore, any variations and modifications within the scope of equivalents of the Claims fall within the scope of the present invention.

The invention claimed is:

1. An electronic device starter for causing an electronic device to start operating wirelessly from a position remote from said electronic device, the device starter comprising:
   an operation directing unit; and
   an operation control unit provided in said electronic device,
   said operation directing unit including:
      start signal sending means for wirelessly sending a start signal for directing said electronic device to start or stop operating, and said operation control unit including:
      receiving means for receiving a wireless signal sent from said operation directing unit;
      detection means for detecting said start signal from among wireless signals received by said receiving means;
      energy conversion means for converting a wireless signal received by said receiving means into electric energy for operating said operation control unit;
      a capacitor charged by said electric energy and configured to supply energy to said operation control unit; and
      switch means interposed on a power supply line used for supplying operating power to said electronic device for turning on/off power supply to said electronic device;
   wherein said operation control unit includes state retaining means for retaining the on state of said switch means even when electric energy supply from said capacitor stops after a switch control means changes said switch means from the off state to the on state; and
   switch control means for changing said switch means from an off state to an on state when said switch means is in an off state and said start signal is detected by said detection means, and for changing said switch means from an on state to an off state when said switch means is in an on state and a start signal is detected by said detection means.

2. The electronic device starter according to claim 1, wherein
said operation directing unit has an operation section including a switch and said start signal sending means sends said start signal based on an actuation of said switch by an operator.

3. The electronic device starter according to claim 1,
characterized in that said start signal includes operation-start-instruction information for instructing said electronic device to start operating and identification information for identifying an electronic device to be started;
said operation control unit comprises means for storing identification information assigned to an electronic device to be controlled by said operation control unit; and
said switch control means comprises means for placing said switch means in the on state if said stored identification information matches the identification information included in said start signal.

4. The electronic device starter according to claim 1,
characterized in that said operation control unit stores a plurality of different pieces of identification information and controls operation of a plurality of electronic devices associated with said plurality of pieces of identification information.

5. The electronic device starter according to claim 1,
characterized in that said energy conversion means has auxiliary energy means for converting at least one wave selected from a group consisting of an electromagnetic wave, a sound wave, an ultrasonic wave, and light in ambient atmosphere into electric energy and supplying the electric energy to said operation control unit.

6. The electronic device starter according to claim 1, characterized in that the wireless signal sent from said operation directing unit to said operation control unit is an electromagnetic wave.

7. The electronic device starter according to claim 1,
characterized in that the wireless signal sent from said operation directing unit to said operation control unit is an ultrasonic wave.

8. The electronic device starter according to claim 1,
characterized in that the wireless signal sent from said operation directing unit to said operation control unit is light.

* * * * *

UNITED STATES PATENT AND TRADEMARK OFFICE
CERTIFICATE OF CORRECTION

PATENT NO. : 7,288,852 B2  Page 1 of 1
APPLICATION NO. : 11/411820
DATED : October 30, 2007
INVENTOR(S) : Kanazawa Yutaka Hattori It is certified that error appears in the above-identified patent and that said Letters Patent is hereby corrected as shown below:

Column 6, line 43, which reads "fires", should read -- tires --

Column 7, line 34, which reads "prestored", should read -- pre-stored --

Column 8, line 2, which reads "AID", should read -- A/D --

Column 8, line 37, which reads "AID", should read -- A/D --

Column 8, line 41, which reads "AID", should read -- A/D --

Column 9, line 2, which reads "liquid crystal", should read -- liquid-crystal --

Column 10, line 35, which reads "ti", should read -- t1 --

Column 13, line 19, which reads "AID", should read -- A/D --

Column 16, line 11, which reads "spacing", should read -- specifying --

Column 18, line 26, which reads "device-64C,", should read -- device 64C, --

Column 20, line 58, which reads "device;", should read -- device, --

Signed and Sealed this

Sixth Day of May, 2008

JON W. DUDAS
*Director of the United States Patent and Trademark Office*